(12) United States Patent
Jiang et al.

(10) Patent No.: US 11,539,570 B2
(45) Date of Patent: Dec. 27, 2022

(54) I/Q IMBALANCE COMPENSATION

(71) Applicant: HUAWEI TECHNOLOGIES CO., LTD., Guangdong (CN)

(72) Inventors: Hong Jiang, Plano, TX (US); Wael Alqaq, Plano, TX (US); Zhihang Zhang, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/341,077

(22) Filed: Jun. 7, 2021

(65) Prior Publication Data

US 2021/0297303 A1 Sep. 23, 2021

Related U.S. Application Data

(63) Continuation of application No. PCT/CN2019/093107, filed on Jun. 26, 2019.

(60) Provisional application No. 62/776,849, filed on Dec. 7, 2018.

(51) Int. Cl.
*H04L 27/36* (2006.01)
*H04L 27/00* (2006.01)
*H04L 27/38* (2006.01)

(52) U.S. Cl.
CPC ........ *H04L 27/364* (2013.01); *H04L 27/0014* (2013.01); *H04L 27/3863* (2013.01); *H04L 2027/0016* (2013.01)

(58) Field of Classification Search
CPC . H04L 27/0014; H04L 27/0016; H04L 27/34; H04L 27/36; H04L 27/361; H04L 27/362; H04L 27/364; H04L 27/3863
See application file for complete search history.

(56) References Cited

U.S. PATENT DOCUMENTS

| | | | |
|---|---|---|---|
| 9,300,444 B2 * | 3/2016 | Hormis | H04B 17/17 |
| 2012/0213266 A1 * | 8/2012 | Su | H04B 17/21 |
| | | | 375/226 |
| 2013/0266102 A1 * | 10/2013 | Yan | H04B 1/1081 |
| | | | 375/350 |
| 2014/0273902 A1 * | 9/2014 | An | H04B 17/21 |
| | | | 455/226.1 |
| 2015/0030103 A1 * | 1/2015 | Hormis | H04L 1/243 |
| | | | 375/296 |
| 2017/0005737 A1 * | 1/2017 | Yang | H04B 17/11 |

* cited by examiner

*Primary Examiner* — Siu M Lee
(74) *Attorney, Agent, or Firm* — Fish & Richardson P.C.

(57) ABSTRACT

The disclosure relates to technology for compensating for I/Q imbalance. An apparatus includes I-path circuitry having a first analog filter configured to filter an I-path signal and Q-path circuitry having a second analog filter configured to filter a Q-path signal. An I/Q imbalance compensation circuit of the apparatus is configured to process digital versions of the I-path signal and the Q-path signal to compensate for mismatch between the I-path circuitry and the Q-path circuitry. A first circuit of the apparatus is configured to apply a coarse adjustment to at least one of the first analog filter or the second analog filter to reduce an initial mismatch between the I-path circuitry and the Q-path circuitry. The first circuit is configured to operate the I/Q imbalance compensation circuit to compensate for a residual mismatch between the I-path circuitry and the Q-path circuitry with the coarse adjustment applied.

23 Claims, 20 Drawing Sheets

I/Q IMBALANCE COMPENSATION

CROSS REFERENCE TO RELATED APPLICATION

This application is a continuation of International Application No. PCT/CN2019/093107 filed on Jun. 26, 2019, which claims priority to U.S. provisional patent application Ser. No. 62/776,849, filed on Dec. 7, 2018 and entitled "I/Q Imbalance Compensation", which applications are incorporated herein by reference as if reproduced in their entirety.

FIELD

The disclosure generally relates to correcting distortion in a radio transmitter and/or receiver.

BACKGROUND

A radio transmitter may have I-path circuitry and Q-path circuitry. The I-path circuitry and the Q-path circuitry may have counterpart components. For example, the I-path circuitry may have an I-path frequency mixer, whereas the Q-path circuitry may have a Q-path frequency mixer. The frequency mixers in a radio transmitter are sometimes referred to as up-mixers. The up-mixers are used to up-convert the frequency of a signal. In a radio transmitter, the I-path frequency mixer and the Q-path frequency mixer may be fed from a common local oscillator whose phase is offset 90° to one of the frequency mixers. The I-path frequency mixer output and Q-path frequency mixer output are then summed in a summing amplifier to produce the desired radio frequency (RF) signal.

If the local oscillator signal has a frequency of "LO", and an input signal to each mixer is a tone having a frequency of "x", then each frequency mixer outputs a signal with a first tone at "LO−f" and a second tone with a frequency of "LO+f." However, due to the quadrature phase relationship, the tones at LO+f are in phase.

Whereas the tones at LO−f are out of phase. Therefore, the tones below LO can cancel each other out. However, any mismatch in amplitude or phase between the tones degrades the effectiveness of this cancellation. Also, the tones above LO can sum together. However, any mismatch in amplitude or phase between tones degrades the effectiveness of this summing. This mismatch in amplitude or phase is sometimes referred to as an I/Q imbalance, and may result in distortion in the transmitted radio frequency signal. More generally, the input signal to each of the frequency mixers is not a tone, but a signal having a range of frequencies. Thus, I/Q imbalance occurs when the input signals to the frequency mixers have a range of frequencies. The I/Q imbalance may result when there is a mismatch between counterpart components in the I-path circuitry and the Q-path circuitry. The mismatch may be between the frequency mixers and/or counterpart components anywhere else in the I-path circuitry and the Q-path circuitry, such as counterpart analog filters.

Some radio receivers have an I-path frequency mixer and a Q-path frequency mixer which are fed from a common local oscillator whose phase is offset 90° to one of the mixers. These frequency mixers are sometimes referred to as down-mixers. The down-mixers are used to down-convert the frequency of an RF signal. After down-conversion, the signal from each down-mixer may be fed to an analog filter. A mismatch between counterpart components (e.g., counterpart analog filters) in the I-path circuitry and the Q-path circuitry may result in I/Q imbalance. I/Q imbalance in a radio receiver may limit the effectiveness of the design, thereby resulting in distortion.

BRIEF SUMMARY

According to one aspect of the present disclosure, an apparatus is provided for compensating for I/Q imbalance. The apparatus comprises I-path circuitry configured to process an I-path signal. The I-path circuitry comprises a first analog filter configured to filter the I-path signal. The apparatus comprises Q-path circuitry configured to process a Q-path signal. The Q-path circuitry comprises a second analog filter configured to filter the Q-path signal. The apparatus comprises an I/Q imbalance compensation circuit configured to process a digital version of the I-path signal and a digital version of the Q-path signal to compensate for mismatch between the I-path circuitry and the Q-path circuitry. The apparatus comprises a control circuit configured to apply a coarse adjustment to at least one of the first analog filter or the second analog filter to reduce an initial mismatch between the I-path circuitry and the Q-path circuitry. The control circuit is configured to operate the I/Q imbalance compensation circuit to compensate for a residual mismatch between the I-path circuitry and the Q-path circuitry with the coarse adjustment applied to the at least one of the first analog filter or the second analog filter.

Optionally, in any of the preceding aspects, the control circuit is further configured to determine a compensation parameter for the I/Q imbalance compensation circuit to compensate for the initial mismatch between the I-path circuitry and the Q-path circuitry. The control circuit is further configured to determine the coarse adjustment based on the compensation parameter.

Optionally, in any of the preceding aspects, the control circuit is further configured to determine the coarse adjustment based on a correlation between the compensation parameter and mismatch between the first analog filter and the second analog filter.

Optionally, in any of the preceding aspects, the compensation parameter comprises a value for a frequency dependent coefficient.

Optionally, in any of the preceding aspects, the compensation parameter comprises a first value for a frequency independent coefficient and a second value for a frequency dependent coefficient.

Optionally, in any of the preceding aspects, the control circuit is further configured to configure the first analog filter and the second analog filter to have a plurality of different mismatches. The control circuit is further configured to determine, for each of the different mismatches, a compensation parameter for the I/Q imbalance compensation circuit. The control circuit is further configured to determine the coarse adjustment based on the compensation parameters for each of the different mismatches.

Optionally, in any of the preceding aspects, the control circuit is further configured to determine the coarse adjustment based on an estimate that is predicted to minimize the mismatch between the first analog filter and the second analog filter.

Optionally, in any of the preceding aspects, the I-path circuitry further comprises a first frequency mixer configured to up-convert the I-path signal to an I-path radio frequency (RF) signal after the first analog filter filters the i-path signal. The Q-path circuitry further comprises a second frequency mixer configured to up-convert the Q-path signal to a Q-path RF signal after the second analog filter filters the Q-path signal. The apparatus further comprises signal combining circuitry configured to combine the I-path RF signal with the Q-path RE signal to form an RE transmission signal.

Optionally, in any of the preceding aspects, the I-path signal comprises an I-path calibration signal. The first frequency mixer is configured to up-convert the I-path calibration signal to an I-path RF calibration signal. The Q-path signal comprises a Q-path calibration signal. The second frequency mixer is configured to up-convert the Q-path calibration signal to a Q-path RE calibration signal. The signal combining circuitry is configured to combine the I-path RE calibration signal with the Q-path RE calibration signal to form an RF transmission calibration signal. The control circuit is further configured to sample the RF transmission calibration signal to determine the initial mismatch between the I-path circuitry and the Q-path circuitry.

Optionally, in any of the preceding aspects, the control circuit is further configured to sample the I-path signal after it is filtered by the first analog filter, but prior to being up-converted by the first frequency mixer. The control circuit is further configured to sample the Q-path signal after it is filtered by the second analog filter, but prior to being up-converted by the second frequency mixer. The control circuit is further configured to determine the initial mismatch between the I-path circuitry and the Q-path circuitry based on the sampled I-path signal and the sampled Q-path signal.

Optionally, in any of the preceding aspects, the I/Q imbalance compensation circuit is configured to process the digital version of the I-path signal and the digital version of the Q-path signal to compensate for the residual mismatch between the I-path circuitry and the Q-path circuitry prior to the I-path signal being filtered by the first analog filter and prior to the Q-path signal being filtered by the second analog filter.

Optionally, in any of the preceding aspects, the I-path circuitry further comprises a first frequency mixer configured to receive and down-convert a radio frequency (RF) signal to generate the I-path signal. The Q-path circuitry further comprises a second frequency mixer configured to receive and down-convert the RF signal to generate the Q-path signal. The first analog filter is configured to receive the I-path signal from the first frequency mixer. The second analog filter is configured to receive the Q-path signal from the second frequency mixer.

Optionally, in any of the preceding aspects, the I/Q imbalance compensation circuit is further configured to process the digital version of the I-path signal and the digital version of the Q-path signal to compensate for the residual mismatch between the I-path circuitry and the Q-path circuitry after the I-path signal has been filtered by the first analog filter and after the Q-path signal has been filtered by the second analog filter.

Optionally, in any of the preceding aspects, the I-path circuitry further comprises a first frequency mixer. The Q-path circuitry further comprises a second frequency mixer. The apparatus further comprises an oscillator configured to provide an in-phase local oscillator signal to the first frequency mixer and a quadrature-phase local oscillator signal to the second frequency mixer.

A further aspect comprises a method for compensating for I/Q imbalance. The method comprises processing an I-path signal with I-path circuitry, comprising filtering the I-path signal with a first analog filter. The method comprises processing a Q-path signal with Q-path circuitry, comprising filtering the Q-path signal with a second analog filter. The method also comprises applying a coarse adjustment to at least one of the first analog filter or the second analog filter to reduce an initial mismatch between the I-path circuitry and the Q-path circuitry. The method further comprises processing a digital version of the I-path signal and a digital version of the Q-path signal to compensate for a residual mismatch between the I-path circuitry and the Q-path circuit with the coarse adjustment applied to the at least one of the first analog filter or the second analog filter.

A further aspect comprises a device for processing radio frequency signals. The device comprises I-path circuitry configured to process an I-path signal. The I-path circuitry comprises a first analog filter configured to filter the I-path signal and a first frequency mixer configured to frequency convert the I-path signal. The device also comprises Q-path circuitry configured to process a Q-path signal. The Q-path circuitry comprises a second analog filter configured to filter the Q-path signal and a second frequency mixer configured to frequency convert the Q-path signal. The device comprises an oscillator configured to provide an in-phase local oscillator signal to the first frequency mixer and a quadrature-phase local oscillator signal to the second frequency mixer. The device comprises non-transitory memory storage comprising instructions. The device comprises one or more processors in communication with the non-transitory memory storage. The one or more processors execute the instructions to apply a coarse adjustment to at least one of the first analog filter or the second analog filter to reduce an initial mismatch between the I-path circuitry and the Q-path circuitry. The one or more processors execute the instructions to process a digital version of the I-path signal and a digital version of the Q-path signal to compensate for a residual mismatch between the I-path circuitry and the Q-path circuitry with the coarse adjustment applied to the at least one of the first analog filter or the second analog filter.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

Figure 1:
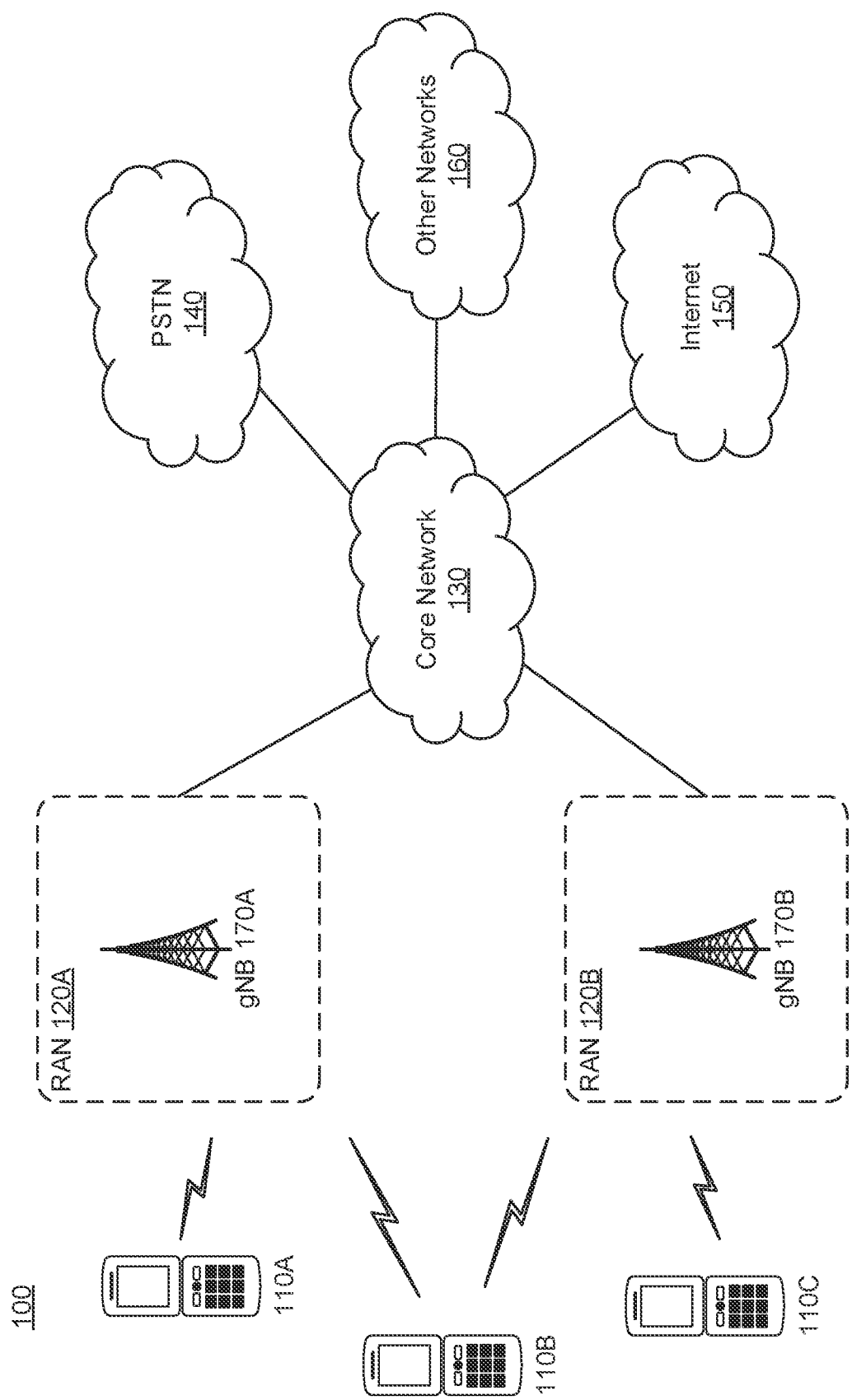
FIG. 1 illustrates a wireless network for communicating data.

The present disclosure will now be described with reference to the figures, which in general relate to an apparatus and method for processing radio frequency signals. One embodiment includes a radio transmitter that is configured to reduce I/Q imbalance. One embodiment includes a radio receiver that is configured to reduce I/Q imbalance.

One embodiment of an apparatus has I-path circuitry having an I-path analog filter, as well as a Q-path circuitry having a Q-path analog filter. The apparatus comprises a radio transmitter, in one embodiment. The apparatus comprises a radio receiver, in one embodiment. Each analog filter may be a low pass filter. A mismatch between these analog filters may result in I/Q imbalance. Other factors can lead to I/Q imbalance. For example, a mismatch between an I-path frequency mixer and a Q-path frequency mixer can also result in I/Q imbalance. I/Q imbalance may also result if the local oscillator signals that are provided to the I-path frequency mixer and the Q-path frequency mixer are not exactly 90 degrees out of phase. It can be very difficult to design counterpart analog filters in the I-path circuitry and Q-path circuitry that precisely match. Hence, the counterpart analog filters are a significant factor in I/Q imbalance, in some radio transmitters and/or receivers.

An apparatus, in one embodiment, has a digital section and an analog section. The apparatus comprises a radio transmitter, in one embodiment. The apparatus comprises a radio receiver, in one embodiment. The analog section may include an analog filter and a frequency mixer for each path (e.g., I-path and Q-path). The digital section may include an I/Q mismatch compensation circuit, which may be used to correct I/Q imbalance. The I/Q mismatch compensation circuit operates in the digital domain by processing a digital version of an I-path signal and a digital version of a Q-path signal, in one embodiment. In one embodiment, I/Q imbalance is reduced by applying a coarse adjustment to an analog filter in at least one of the paths (e.g., an I-path analog filter and/or a Q-path analog filter) as well as a fine adjustment in the digital domain using the I/Q mismatch compensation circuit.

The coarse adjustment to the analog filter(s) may be used to substantially reduce the mismatch between analog filters in I-path circuitry and the Q-path circuitry. Since this is a coarse adjustment, it does not require that the mismatch between the analog filters be eliminated. The coarse adjustment does not require complex or high precision circuitry. In one embodiment, the coarse adjustment is made based on one or more digital domain correction parameters for the I/Q mismatch compensation circuit. As will be explained more fully below, determining the analog domain coarse adjustment based on the digital domain correction parameters does not require complex or high precision circuitry, or intensive computations.

The fine adjustment in the digital domain may be used to achieve very low distortion. Moreover, because of the coarse adjustment to the analog filters, the fine adjustment may only require a small error correction. Therefore, the fine adjustment in the digital domain is not computationally complex. If the imbalance to be compensated for is too large, the computation in the digital domain could take a very long time to converge, or even fail to converge. However, computation for the fine adjustment in digital domain converges quickly.

Correcting for I/Q imbalance can be a greater challenge in transceivers that support a wide bandwidth. For example, for some standards a transceiver may need to support a 200 MHz baseband bandwidth. Embodiments of I/Q imbalance compensation disclosed herein are suitable for transceivers that support a wide bandwidth, but are not limited thereto.

Correcting for I/Q imbalance can be a greater challenge in transceivers that support higher orders of modulation. For example, for some standards, a transceiver may need to support modulation with an order of four or higher. An example of modulation with an order of four or higher includes quadrature phase-shift keying. Embodiments of I/Q imbalance compensation disclosed herein are suitable for transceivers that support modulation with an order of four or higher, but are not limited thereto.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

FIG. 1 illustrates a wireless network for communicating data. The communication system 100 includes, for example, user equipment 110A, 110B, and 110C, radio access networks (RANs) 120A and 120B, a core network 130, a public switched telephone network (PSTN) 140, the Internet 150, and other networks 160. Additional or alternative networks include private and public data-packet networks including corporate intranets. While certain numbers of these components or elements are shown in the figure, any number of these components or elements may be included in the system 100.

In one embodiment, the wireless network may be a fifth generation (5G) network including at least one 5G base station which employs orthogonal frequency-division multiplexing (OFDM) and/or non-OFDM and a transmission time interval (TTI) shorter than 1 ms (e.g., 100 or 200 microseconds), to communicate with the communication devices. In general, a base station may also be used to refer any of the eNB and the 5G BS (gNB). In addition, the network may further include a network server for processing information received from the communication devices via the at least one eNB or gNB.

System 100 enables multiple wireless users to transmit and receive data and other content. The system 100 may implement one or more channel access methods, such as, but not limited to, code division multiple access (CDMA), time division multiple access (TDMA), frequency division multiple access (FDMA), orthogonal FDMA (OFDMA), or single-carrier FDMA (SC-FDMA).

The user equipment (UE) 110A, 110B, and 110C, which can be referred to individually as a UE 110, or collectively as the UEs 110, are configured to operate and/or communicate in the system 100. For example, a UE 110 can be configured to transmit and/or receive wireless signals or wired signals. Each UE 110 represents any suitable end user device and may include such devices (or may be referred to) as a user equipment/device, wireless transmit/receive unit (UE), mobile station, fixed or mobile subscriber unit, pager, cellular telephone, personal digital assistant (PDA), smartphone, laptop, computer, touchpad, wireless sensor, wearable devices, or consumer electronics device.

In the depicted embodiment, the RANs 120A, 120B include one or more base stations (BSs) 170A, 170B, respectively. The RANs 120A and 120B can be referred to individually as a RAN 120, or collectively as the RANs 120. Similarly, the base stations (BSs) 170A and 170B can be referred individually as a base station (BS) 170, or collectively as the base stations (BSs) 170. Each of the BSs 170 is configured to wirelessly interface with one or more of the UEs 110 to enable access to the core network 130, the PSTN 140, the Internet 150, and/or the other networks 160. For example, the base stations (BSs) 170 may include one or more of several well-known devices, such as a base transceiver station (BTS), a Node-B (NodeB), an evolved NodeB (eNB), a next (fifth) generation (5G) NodeB (gNB), a Home NodeB, a Home eNodeB, a site controller, an access point (AP), or a wireless router, or a server, router, switch, or other processing entity with a wired or wireless network.

In one embodiment, the BS 170A forms part of the RAN 120A, which may include one or more other BSs 170, elements, and/or devices. Similarly, the BS 1703 forms part of the RAN 120B, which may include one or more other BSs 170, elements, and/or devices. Each of the BSs 170 operates to transmit and/or receive wireless signals within a particular geographic region or area, sometimes referred to as a "cell." In some embodiments, multiple-input multiple-output (MIMIC) technology may be employed having multiple transceivers for each cell.

The BSs 170 communicate with one or more of the UEs 110 over one or more air interfaces (not shown) using wireless communication links. The air interfaces may utilize any suitable radio access technology.

It is contemplated that the system 100 may use multiple channel access functionality, including for example schemes in which the BSs 170 and UEs 110 are configured to implement the Long Term Evolution (LTE) wireless communication standard, LTE Advanced (LTE-A), and/or LTE Multimedia Broadcast Multicast Service (MBMS). In other embodiments, the base stations 170 and user equipment 110A-110C are configured to implement UMTS, HSPA, or HSPA+ standards and protocols. Of course, other multiple access schemes and wireless protocols may be utilized.

The RANs 120 are in communication with the core network 130 to provide the UEs 110 with voice, data, application, Voice over Internet Protocol (VoIP), or other services. As appreciated, the RANs 120 and/or the core network 130 may be in direct or indirect communication with one or more other RANs (not shown). The core network 130 may also serve as a gateway access for other networks (such as PSTN 140, Internet 150, and other networks 160). In addition, some or all of the UEs 110 may include functionality for communicating with different wireless networks over different wireless links using different wireless technologies and/or protocols.

The RANs 120 may also include millimeter and/or microwave access points (APs). The APs may be part of the BSs 170 or may be located remote from the BSs 170. The APs may include, but are not limited to, a connection point (an mmW CP) or a BS 170 capable of mmW communication (e.g., a mmW base station). The mmW APs may transmit and receive signals in a frequency range, for example, from 24 GHz to 100 GHz, but are not required to operate throughout this range. As used herein, the term base station is used to refer to a base station and/or a wireless access point.

Although FIG. 1 illustrates one example of a communication system, various changes may be made to FIG. 1. For example, the communication system 100 could include any number of user equipment, base stations, networks, or other components in any suitable configuration. It is also appreciated that the term user equipment may refer to any type of wireless device communicating with a radio network node in a cellular or mobile communication system. Non-limiting examples of user equipment are a target device, device-to-device (D2D) user equipment, machine type user equipment or user equipment capable of machine-to-machine (M2M) communication, laptops, PDAs, iPads, Tablets, mobile terminals, smart phones, laptop embedded equipped (LEE), laptop mounted equipment (LME), and USB dongles.

Figure 2:
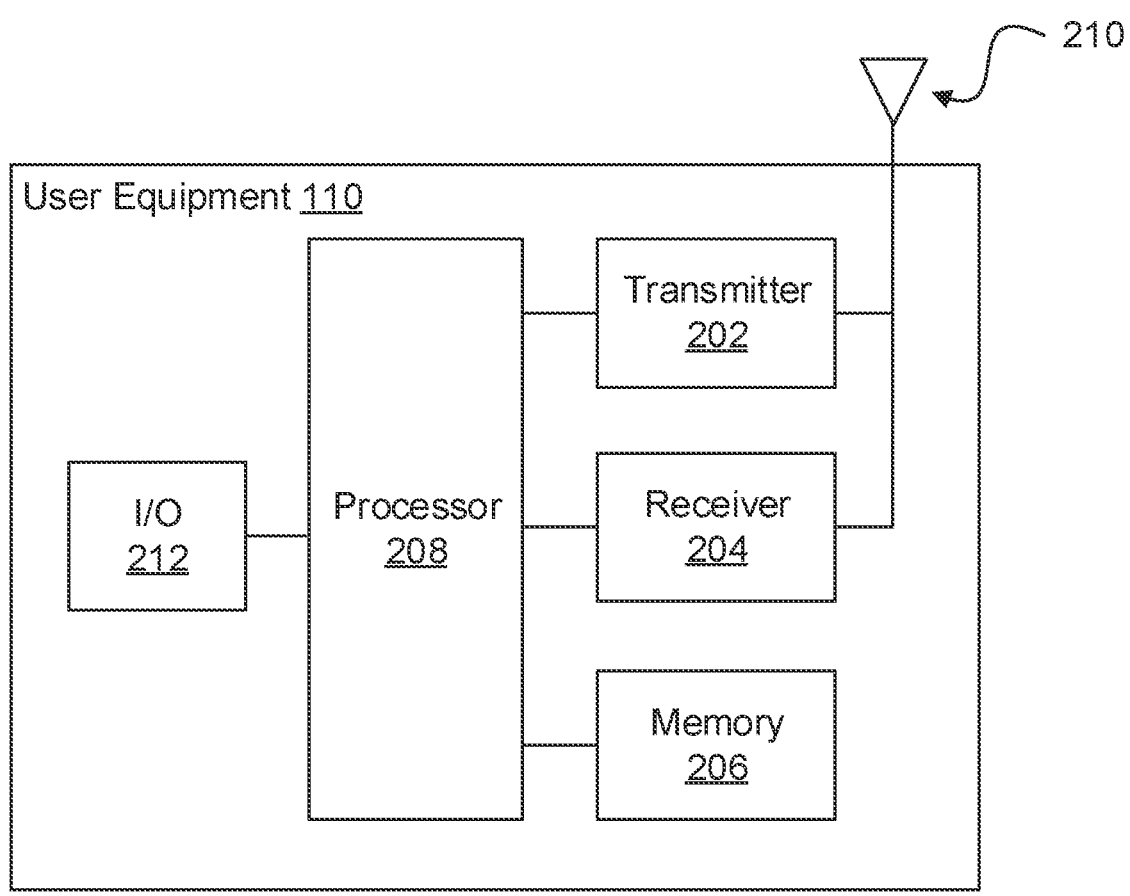
FIG. 2 illustrates example details of user equipment (UE) that may implement the methods and teachings according to this disclosure.

FIG. 2 illustrates example details of a UE 110 that may implement the methods and teachings according to this disclosure. The UE 110 may for example be a mobile telephone, but may be other devices in further examples such as a desktop computer, laptop computer, tablet, handheld computing device, automobile computing device and/or other computing devices. As shown in the figure, the exemplary UE 110 is shown as including at least one transmitter 202, at least one receiver 204, memory 206, at least one processor 208, and at least one input/output (I/Q) device 212. The processor 208 can implement various processing operations of the UE 110. For example, the processor 208 can perform signal coding, data processing, power control, input/output processing, or any other functionality enabling the UE 110 to operate in the system 100 (FIG. 1). The processor 208 may include any suitable processing or computing device configured to perform one or more operations. For example, the processor 208 may include a microprocessor, microcontroller, digital signal processor, field programmable gate array, or application specific integrated circuit. The memory 206 is non-transitory memory storage, in one embodiment.

The transmitter 202 can be configured to modulate data or other content for transmission by at least one antenna 210. The transmitter 202 can also be configured to amplify, filter, and frequency convert RF signals before such signals are provided to the antenna 210 for transmission. The transmitter 202 can include any suitable structure for generating signals for wireless transmission.

The receiver 204 can be configured to demodulate data or other content received by the at least one antenna 210. The receiver 204 can also be configured to amplify, filter, and frequency convert RF signals received via the antenna 210. The receiver 204 is an RF signal receiver, in some embodiments. The receiver 204 can include any suitable structure for processing signals received wirelessly. The antenna 210 can include any suitable structure for transmitting and/or receiving wireless signals. The same antenna 210 can be used for both transmitting and receiving RF signals, or alternatively, different antennas 210 can be used for transmitting signals and receiving signals.

It is appreciated that one or multiple transmitters 202 could be used in the UE 110, one or multiple receivers 204 could be used in the UE 110, and one or multiple antennas 210 could be used in the UE 110. Although shown as separate blocks or components, at least one transmitter 202 and at least one receiver 204 could be combined into a transceiver. Accordingly, rather than showing a separate block for the transmitter 202 and a separate block for the receiver 204 in FIG. 2, a single block for a transceiver could have been shown.

The UE 110 further includes one or more input/output devices 212. The input/output devices 212 facilitate interaction with a user. Each input/output device 212 includes any suitable structure for providing information to or receiving information from a user, such as a speaker, microphone, keypad, keyboard, display, or touch screen.

In addition, the UE 110 includes at least one memory 206. The memory 206 stores instructions and data used, generated, or collected by the UE 110. For example, the memory 206 could store software or firmware instructions executed by the processor(s) 208 and data used to reduce or eliminate interference in incoming signals. Each memory 206 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

Figure 3:
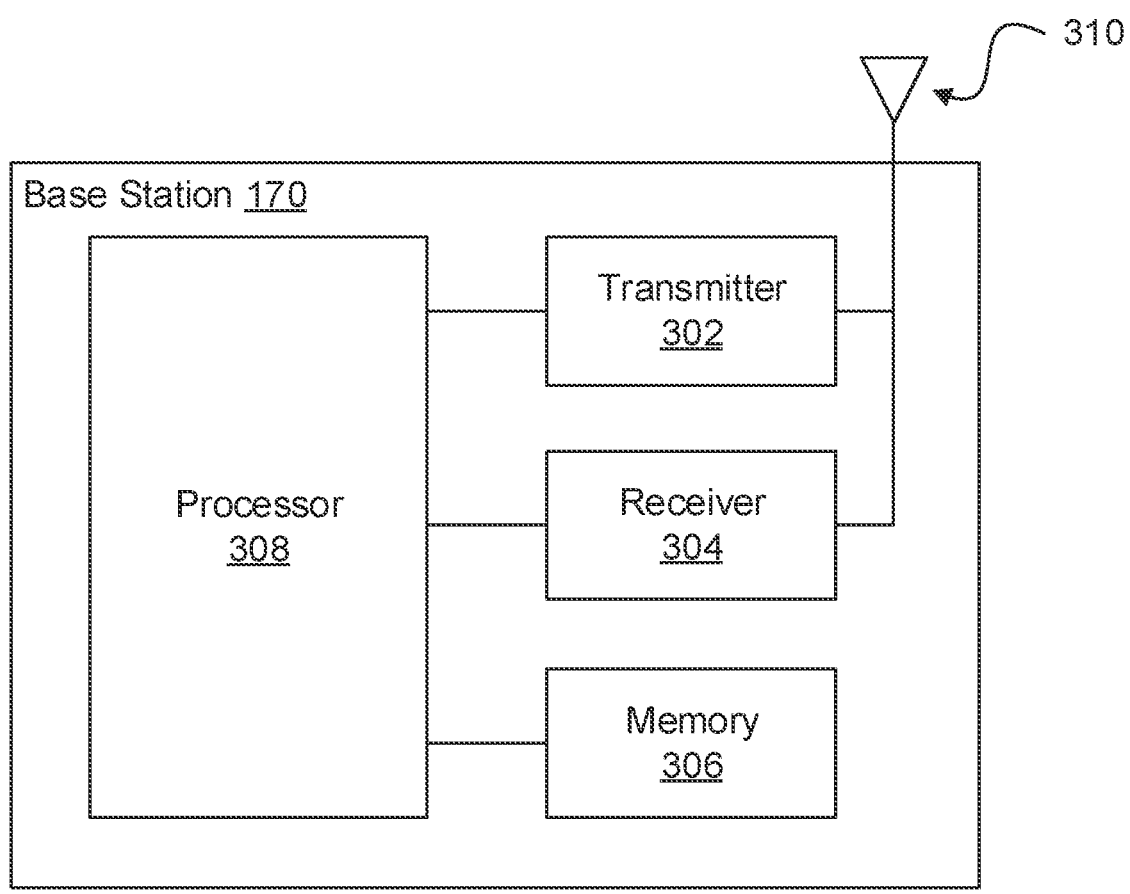
FIG. 3 illustrates an example base station (BS) that may implement the methods and teachings according to this disclosure.

FIG. 3 illustrates an example BS 170 that may implement the methods and teachings according to this disclosure. As shown in the figure, the BS 170 includes at least one processor 308, at least one transmitter 302, at least one receiver 304, one or more antennas 310, and at least one memory 306. The processor 308 implements various processing operations of the BS 170, such as signal coding, data processing, power control, input/output processing, or any other functionality. Each processor 308 includes any suitable processing or computing device configured to perform one or more operations. Each processor 308 could, for example, include a microprocessor, microcontroller, digital signal processor, field programmable gate array, or application specific integrated circuit. The memory 306 is non-transitory memory storage, in one embodiment.

Each transmitter 302 includes any suitable structure for generating signals for wireless transmission to one or more UEs 110 or other devices. Each receiver 304 includes any suitable structure for processing signals received wirelessly from one or more UEs 110 or other devices. Although shown as separate blocks or components, at least one transmitter 302 and at least one receiver 304 could be combined into a transceiver. Each antenna 310 includes any suitable structure for transmitting and/or receiving wireless signals. While a common antenna 310 is shown here as being coupled to both the transmitter 302 and the receiver 304, one or more antennas 310 could be coupled to the transmitter(s) 302, and one or more separate antennas 310 could be coupled to the receiver(s) 304. Each memory 306 includes any suitable volatile and/or non-volatile storage and retrieval device(s).

Figure 4:
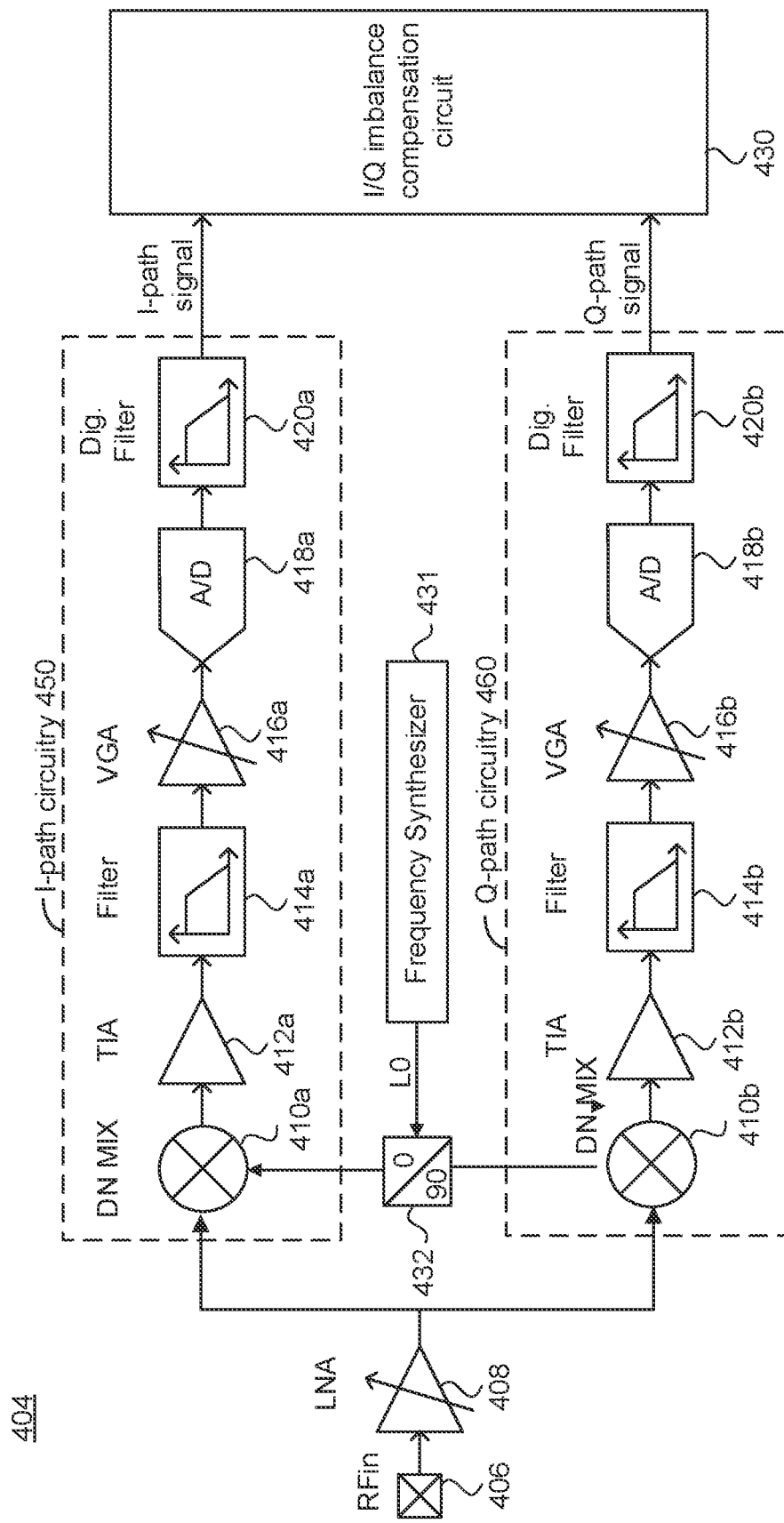
FIG. 4 illustrates a block diagram of one embodiment of a receiver.

FIG. 4 illustrates a block diagram of one embodiment of a receiver 404. The receiver 404 can be the receiver 204 included in the UE 110 (shown in FIG. 2) or the receiver 304 included in the BS 170 (shown in FIG. 3), but is not limited thereto. The receiver 404 is a direct conversion receiver (DCR), in one embodiment. However, embodiments disclosed herein for correcting I/Q imbalance are not limited to direct conversion receivers.

The receiver 404 has I-path circuitry 450 and Q-path circuitry 460. The I-path circuitry 450 processes an I-path signal. The Q-path circuitry 460 processes a Q-path signal. Ideally, both the gain and the phase of the transfer function of the I-path circuitry 450 and Q-path circuitry 460 will be the same. In the event that either the magnitude of the transfer function of the I-path circuitry 450 and Q-path circuitry 460 do not match or the phase difference of the transfer function of the I-path circuitry 450 and Q-path circuitry 460 is not exactly 90 degrees there may be an I/Q imbalance.

The I-path circuitry 450 and the Q-path circuitry 460 have counterpart components. For example, whereas I-path circuitry 450 has analog filter 414a, Q-path circuitry 460 has analog filter 414b. Ideally, the counterpart components are matched. However, there may be some mismatch between counterpart components in the I-path circuitry 450 and the Q-path circuitry 460. Such a mismatch can result in I/Q imbalance.

The I/Q imbalance compensation circuit 430 is configured to compensate for I/Q imbalance. The I/Q imbalance compensation circuit 430 may be implemented in hardware, software, or a combination of hardware and software. The I/Q imbalance compensation circuit 430 processes a digital version of the I-path signal and a digital version of the Q-path signal to compensate for I/Q imbalance. Therefore, the I/Q imbalance compensation circuit 430 operates in the digital domain. The I/Q imbalance compensation circuit 430 is a multi-tap I/Q imbalance compensation circuit 430, in one embodiment. Each tap receives a different compensation parameter, in one embodiment. A compensation parameter is referred to as a coefficient (or "compensation coefficient"), in one embodiment. In one embodiment, the I/Q imbalance compensation circuit 430 has two taps. One tap receives a frequency independent coefficient, and the other tap receives a frequency dependent coefficient. In one embodiment, the I/Q imbalance compensation circuit 430 has three or more taps. When there are three or more taps, the additional taps are frequency dependent coefficients, in one embodiment.

In general, having more taps (and more coefficients) can lead to better compensation for I/Q imbalance. For example, additional frequency dependent coefficients may be used to provide a more precise compensation for the I/Q imbalance by addressing higher order effects. However, having more taps (and hence more coefficients) may require the I/Q imbalance compensation circuit 430 to be more complex. Also, the process of determining values for the coefficients may become much more complex as the number of coefficients increases. For example, it may take considerable time and/or processing power for the solution (of determining the coefficients) to converge. Technology is described herein for achieving very low I/Q imbalance with a two-tap I/Q imbalance compensation circuit 430 by first making a coarse adjustment to analog filters in the I-path circuitry 450 and the Q-path circuitry 460. However, more than two taps may be used, if desired.

Operation of the receiver 404 will now be described. The receiver 404 demodulates an incoming radio frequency (RF) signal using synchronous detection driven by a local oscillator (LO) signal from a quadrature generator 432. The quadrature generator 432 receives the LO signal from the frequency synthesizer 431 and produces two versions of the LO signal that have a quadrature relationship. One version is in-phase (I), with the other version having a quadrature (Q) or 90 degree phase relationship with the in-phase signal. The frequency of the local oscillator (LO) signal may be very close to or equal to the carrier frequency of the desired signal. The receiver 404 may also be referred to as an RF signal receiver.

The receiver 404 is shown as including an input 406 at which is received a radio frequency (RF) signal, and thus, the input 406 can also be referred to as the RF input 406. The RF input 406 can be coupled to an antenna or a coupler, but is not limited thereto. The RF signal received by the RF input 406 is provided to a low noise amplifier (LNA) 408, which may have an adjustable gain. The LNA 408 amplifies the relatively low-power RF signal it receives without significantly degrading the signal's signal-to-noise ratio (SNR).

The amplified RF signal that is output by the LNA 408 is provided to both the I-path circuitry 450 and the Q-path circuitry 460. Operation of the I-path circuitry 450 will be discussed in detail. The Q-path circuitry 460 has counterpart components and operates in a similar manner. Frequency mixer 410a receives the amplifier RF signal from the LNA 408, and an oscillator signal (LO) from a frequency synthesizer 431, as two input signals. The frequency mixer 410a creates a new signal from the amplifier RF signal and the oscillator signal. The frequency mixer 410a may shift (e.g., decrease) a frequency of the amplifier RF signal by a frequency of the oscillator signal to create the new signal. The amplifier RF signal may occupy a frequency range, in which case the frequency mixer 410a may shift the frequency range of the amplifier RF signal by a frequency of the oscillator signal (LO). The frequency mixer 410a in FIG. 4 is a down-mixer (DN MIX) that frequency down-converts the amplified RF signal from a relatively high frequency to a baseband frequency, in one embodiment. Alternatively, the down-conversion can be to an intermediate frequency. In one embodiment, frequency mixer 410a generates an I-path signal from the amplified RE signal.

Still referring to FIG. 4, the frequency down-converted signal that is output from the mixer 410a is shown as being provided to a trans-impedance amplifier (TIA) 412a. The TIA 412a acts as a current buffer to isolate an analog filter 414a that is downstream of the TIA 412a, from the mixer 410a that is upstream of the TIA 412a. The analog filter 414a low pass filters the frequency down-converted signal, to filter out high frequency signal components that are not of interest, such as HF noise. The filtered down-converted signal that is output from the analog filter 414a is provided to a variable gain amplifier (VGA) 416a, which is used to amplify the down-converted signal before it provided to an analog-to-digital converter (A/D) 418a, which converts the down-converted signal from an analog signal to a digital signal. The digital signal output from the A/D 418a is then provided to a digital filter 420a, which performs additional filtering to remove out of band signal components and attenuates quantization energy from the A/D 418a. The filtered digital signal that is output by the digital filter 420a is then provided to the I/Q imbalance compensation circuit 430 that is downstream from the digital filter 420a. FIG. 4 refers to the filtered digital signal as an I-path signal. The I-path signal is generated using the frequency mixer 410a. Hence, all of the components in the I-path circuitry 450 process the I-path signal. The I/Q imbalance compensation circuit 430 processes the digital version of the I-path signal.

Operation of Q-path circuitry 460 is similar to the I-path circuitry 450, and will not be described in detail. The amplified RF signal that is output by the LNA 408 is provided to the Q-path circuitry 460. Frequency mixer 410b receives the amplifier RE signal from the LNA 408, and an oscillator signal (LO) from the frequency synthesizer 431, as two input signals. The oscillator signal (LO) that is provided to frequency mixer 410b is in quadrature (e.g., shifted 90 degrees) relative to the oscillator signal (LO) that is provided to frequency mixer 410a. The frequency down-converted signal that is output from the mixer 410b is shown as being provided to a trans-impedance amplifier (TIA) 412b. The analog filter 414b low pass filters the frequency down-converted signal, to filter out high frequency signal components that are not of interest, such as HF noise. The filtered down-converted signal that is output from the analog filter 414b is provided to a variable gain amplifier (VGA) 416b, which is used to amplify the down-converted signal before it is provided to an analog-to-digital converter (A/D) 418b, which converts the down-converted signal from an analog signal to a digital signal. The digital signal output from the A/D 418b is then provided to a digital filter 420b, which performs additional filtering to remove out of band signal components and attenuates quantization energy from the A/D 418b. The filtered digital signal that is output by the digital filter 420b is then provided to the I/Q imbalance compensation circuit 430 that is downstream from the digital filter 420b. FIG. 4 refers to the filtered digital signal as a Q-path signal. The Q-path signal is generated using the frequency mixer 410b. Hence, all of the components in the Q-path circuitry 460 process the Q-path signal. The I/Q imbalance compensation circuit 430 processes the digital version of the Q-path signal. After the I/Q imbalance compensation circuit 430 processes the I-path and Q-path signals, they may be passed downstream to, for example, an equalizer, or other component.

Due to a mismatch between a component in the I-path circuitry 450 and a counterpart component in the Q-path circuitry 460, there may be an I/Q imbalance. The I/Q imbalance is undesirable as it results in distortion of the desired signal. One possible cause for an I/Q imbalance is mismatch between the analog filters 414a and 414b. The mismatch could be of any characteristic of the filter. One possible mismatch is the analog filters 414a and 414b having different bandwidths. As noted above, the analog filters could be low pass filters, in which case there may be a mismatch in the cutoff frequencies. The gains of the analog filters in the passbands may also be mismatched.

The I/Q imbalance could be due in part to mismatches between other components, such the counterpart mixers 410a, 410b; counterpart TIAs 412a, 412b; counterpart VGAs 416a, 416b; counterpart A/Ds 418a, 418b; or counterpart digital filters 420a, 420b. The I/Q imbalance could also be due, at least in part, to the LO signals from the quadrature generator 432 not being exactly 90 degrees apart. However, it can be very difficult to manufacture the analog filters 414a and 414b to be precisely matched. Hence, mismatch between the analog filters 414a and 414b can have a significant impact on I/Q imbalance. In some embodiments, a value for a coefficient for the I/Q imbalance compensation circuit 430 that can compensate for a coarse I/Q imbalance is determined when there is a mismatch between the analog filters 414a, 414b. A coarse filter adjustment is determined based on the value for the coefficient. The coarse filter adjustment may adjust any characteristic of an analog filter including, but not limited to, cutoff frequency and/or gain. The gain adjustment can be frequency dependent. The coarse filter adjustment is applied to the analog filter 414a and/or the analog filter 414b to reduce the mismatch between the analog filters 414a, 414b. This can substantially reduce the I/Q imbalance. With the coarse filter adjustment applied, coefficients to compensate for a fine I/Q imbalance are determined. The IQ imbalance compensation circuit 430 is then operated with the values for these coefficients while filtering an I-path signal with the analog filter 414a and a Q-path signal with the analog filter 414b.

The receiver 204 in the UE 110 (shown in FIG. 2), as well as the receiver 304 (shown in FIG. 3) included in the BS 170, are not limited to being direct conversion receivers. For example, receivers 204, 304 could be superheterodyne receivers that have a frequency mixer that changes the incoming radio signal to an intermediate frequency. After processing the intermediate frequency signal, the superheterodyne receiver may have a frequency mixer that down-converts the processed intermediate frequency signal to a baseband signal. Moreover, one embodiment includes a superheterodyne receiver having circuitry that compensates for I/Q imbalance.

Figure 5:
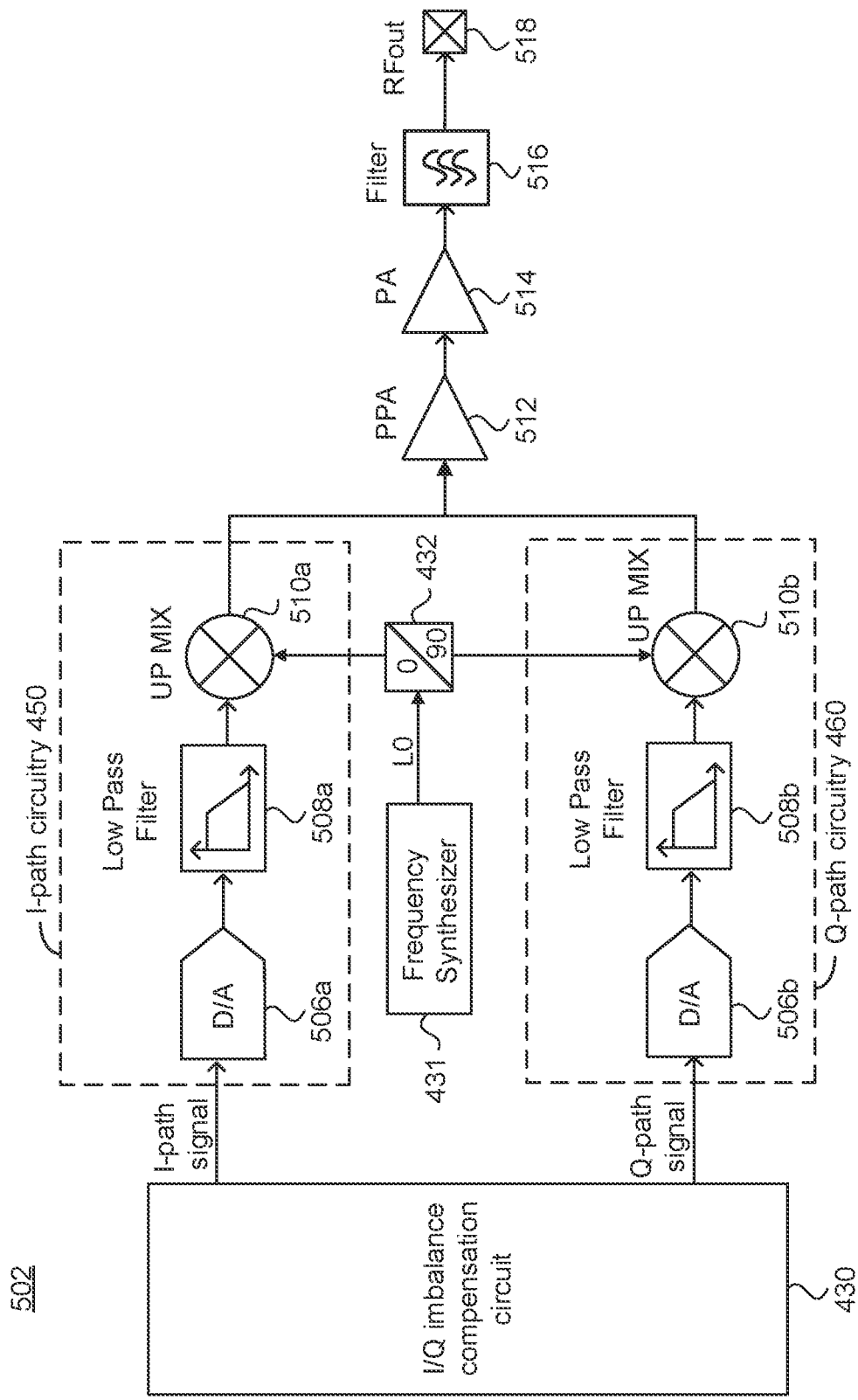
FIG. 5 illustrates details of one embodiment of a transmitter.

FIG. 5 illustrates details of one example of a transmitter 502, which can be the transmitter 202 included in the UE 110 (shown in FIG. 2) or the transmitter 302 included in the BS 170 (shown in FIG. 3), but is not limited thereto. The transmitter 502 may also be referred to as a direct modulation transmitter. Referring to FIG. 5, the transmitter 502 is shown as including an RF output 518 at which is provided as a radio frequency (RF) signal, and thus, the RF output 518 can also be referred to as the RE output 518. The RE signal at output 518 may also be referred to herein as an RF transmission signal. The RF output 518 can be coupled to an antenna or a coupler, but is not limited thereto. The RF signal provided by the RF output 518 is provided from a power amplifier (PA) 514 though the bandpass or notch filter 516. The filter 516 can, for example, be a duplex/SAW filter that is used to remove unwanted frequency components above and below the desired RF frequency range from the amplified RF output signal generated by PA 514. The PA 514 receives its input from a power pre-amplifier (PPA) 512, which initially receives the up-converted signal, to be transmitted, from mixers.

The transmitter 502 has I-path circuitry 450 and Q-path circuitry 460. The I-path circuitry 450 processes an I-path signal. The Q-path circuitry 460 processes a Q-path signal. Ideally, the gain of the transfer function of the I-path circuitry 450 and Q-path circuitry 460 will be the same. Ideally, there will be a 90 degree phase difference in the transfer function of the I-path circuitry 450 and Q-path circuitry 460, in one embodiment. In the event that either the magnitude of the transfer functions of the I-path circuitry 450 and Q-path circuitry 460 do not match or the phase difference of the transfer functions of the I-path circuitry 450 and Q-path circuitry 460 is not exactly 90 degrees there may be an I/Q imbalance. The I/Q imbalance compensation circuit 430 is configured to compensate for I/Q imbalance.

The I/Q imbalance compensation circuit 430 processes a digital version of the I-path signal and a digital version of the Q-path signal to compensate for I/Q imbalance.

Still referring to FIG. 5, the signal to be transmitted is received from the processor 208 of UE 110 of FIG. 2 or processor 308 of BS 170 of FIG. 3 at the I/Q imbalance compensation circuit 430. The I/Q imbalance compensation circuit 430 provides an I-path signal to digital to analog converter 506a, which converts the digital signal to an analog signal. The analog signal is provided to low pass filter 508a to initially remove any high frequency noise before being up-converted at the frequency mixer 510a.

Thus, the analog version of the signal ("analog signal") is provided to frequency mixer 510a, as one input signal. Frequency mixer 510a also receives oscillator signal LO from the quadrature generator 432, as the other input signal. Thus, the frequency mixer 510a may create a new signal from the analog signal and the oscillator signal. The frequency mixer 510a may shift (e.g., increase) a frequency of the analog signal by a frequency of the oscillator signal to create the new signal. In one embodiment, the analog signal is a baseband signal. The LO signal is used as a carrier wave, in one embodiment. In one embodiment, the frequency mixer 510a modulates the oscillator signal (e.g., carrier wave) with the baseband signal to generate a radio frequency (RF) signal.

The I/Q imbalance compensation circuit 430 provides a Q-path signal to digital to analog converter 506b, which converts the digital signal to an analog signal. The analog signal is provided to low pass filter 508b to initially remove any high frequency noise before being up-converted at the frequency mixer 510b. The oscillator signal (LO) that is provided to frequency mixer 510b by the quadrature generator 432 is in quadrature (e.g., shifted 90 degrees) relative to the oscillator signal (LO) that is provided to frequency mixer 510a. The PPA 512 combines the signals from mixers 510a and 510b.

Due to a mismatch between a component in the I-path circuitry 450 and a counterpart component in the Q-path circuitry 460, there may be an I/Q imbalance. One possible cause for an I/Q imbalance is mismatch between the analog low pass filters 508a and 508b. The mismatch could be of any characteristic of the filter. One possible mismatch is the analog low pass filters 508a and 508b having different bandwidths. For example, there may be a mismatch in the cutoff frequencies. The gains of the analog low pass filters 508a and 508b in the passbands may also be mismatched.

The I/Q imbalance could be due in part to mismatches between other components, such the counterpart mixers 510a, 510b; and/or counterpart D/A 506a, 506b. The I/Q imbalance could be due in part to the LO signals that are provided to the mixers 510a, 510b not being exactly in quadrature relationship. However, it can be very difficult to manufacture the analog low pass filters 508a and 508b to be precisely matched. Hence, a mismatch between the analog low pass filters 508a and 508b can make a significant contribution to I/Q imbalance. In some embodiments, a value for a coefficient for the I/Q imbalance compensation circuit 430 that can compensate for a coarse I/Q imbalance is determined when there is a mismatch between the analog low pass filters 508a, 508b. A coarse filter adjustment is determined based on the value for the coefficient. The coarse filter adjustment may adjust any characteristic of an analog low pass filter including, but not limited to, cutoff frequency and/or gain. The gain adjustment can be frequency dependent. The coarse filter adjustment is applied to analog low pass filter 508a and/or analog low pass filter 508b to reduce the mismatch between the analog low pass filter 508a, 508b. This can substantially reduce the I/Q imbalance. With the coarse filter adjustment applied, coefficients to compensate for a fine IQ imbalance are determined. The I/Q imbalance compensation circuit 430 is operated with the values for the coefficients while processing an I-path signal with the I-path circuitry 450 and a Q-path signal with the Q-path circuitry 460.

The transmitter 202 in the UE 110 (shown in FIG. 2), as well as the transmitter 302 included in the BS 170 (shown in FIG. 3), are not limited to being direct conversion transmitters. For example, receivers 204, 304 could be superheterodyne transmitters that have a frequency mixer that shifts the analog signal to an intermediate frequency signal. The frequency mixer modulates an oscillator signal with the analog signal to generate the intermediate frequency signal, in one embodiment. After processing the intermediate frequency signal, the superheterodyne transmitter may have a frequency mixer that up-converts the processed intermediate frequency signal to a radio frequency signal. Moreover, one embodiment includes a superheterodyne transmitter having a circuit configured to compensate for I/Q imbalance.

Figure 6:
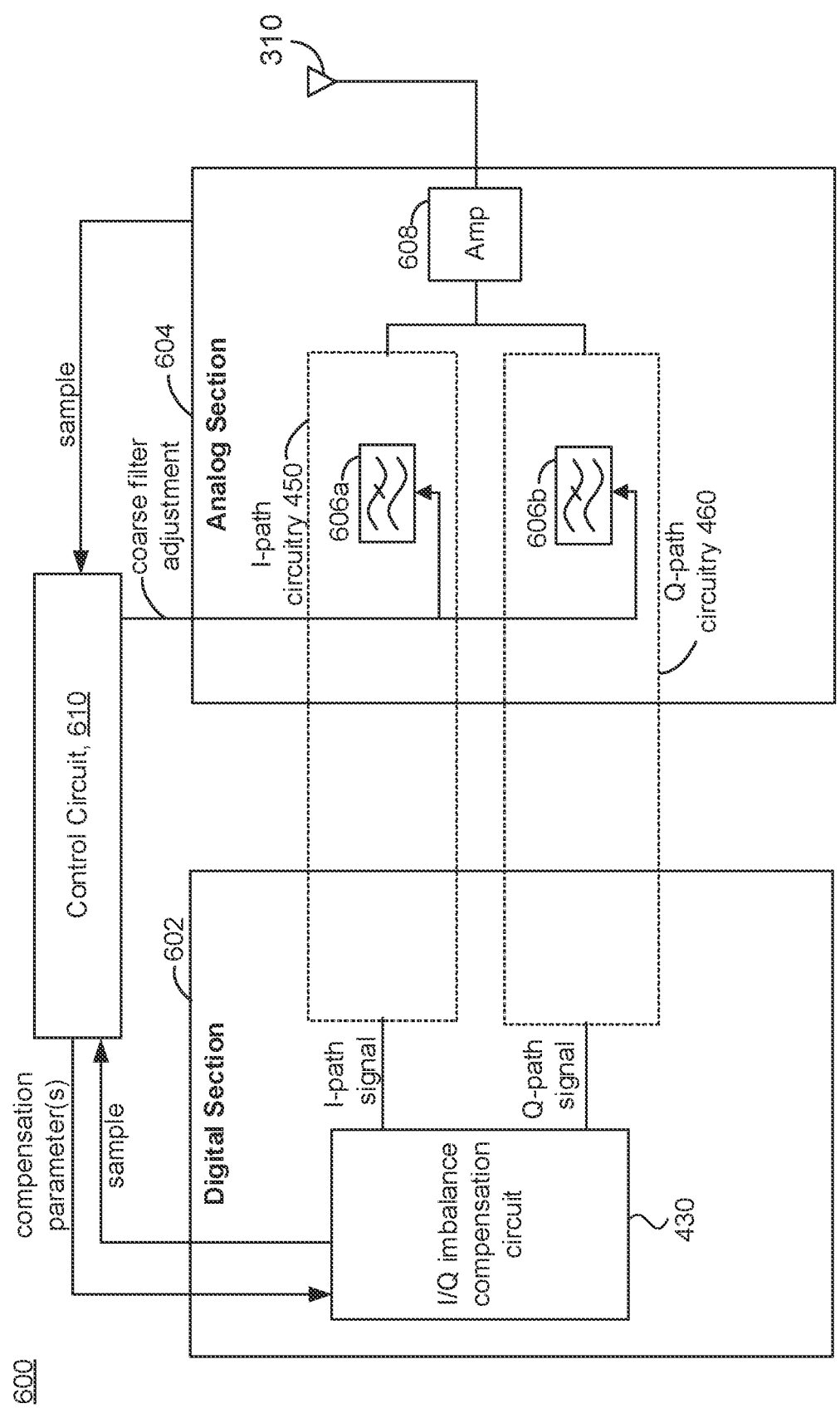
FIG. 6 is a diagram of an apparatus that is configured to compensate for an I/Q imbalance.

FIG. 6 is a diagram of an apparatus 600 that is configured to compensate for an I/Q imbalance. The apparatus 600 includes a radio frequency transmitter, in one embodiment. The apparatus 600 can be the transmitter 202 included in the UE 110 (shown in FIG. 2), the transmitter 302 included in the BS 170 (shown in FIG. 3), or the transmitter 502 (shown in FIG. 5), but is not limited thereto. The apparatus 600 includes a radio frequency receiver, in one embodiment. The apparatus 600 can be the receiver 204 included in the UE 110 (shown in FIG. 2), the receiver 304 included in the BS 170 (shown in FIG. 3), or the receiver 404 (shown in FIG. 4), but is not limited thereto. The apparatus 600 includes both a radio frequency receiver and a radio frequency transmitter, in one embodiment.

The apparatus 600 includes a digital section 602 and an analog section 604. The digital section 602 includes an I/Q imbalance compensation circuit 430, which is configured to compensate for I/Q imbalances. This compensation is made in the digital domain. In other words, the compensation can be made to digital versions of the I-path signal and the Q-path signal. The analog section 604 includes a first analog filter 606a in the I-path circuitry 450, and a counterpart second analog filter 606b in the Q-path circuitry 460. The first analog filter 606a filters the I-path signal and the second analog filter 606a filters the Q-path signal in a similar manner. For example, both filters could be low pass filters that ideally would have the same cutoff frequency. However, there may be some mismatch between the filters 606a, 606b. In one embodiment, the filters 606a, 606b have a relatively wide bandwidth. For example, the filters 606a, 606b have about a 200 MHz bandwidth, in one embodiment. In one embodiment, at least one parameter (e.g., bandwidth, cutoff frequency, and/or gain) of the filters 606a 606b is adjustable. Both the I-path circuitry 450 and the Q-path circuitry 460 have other elements, but those elements are not depicted in FIG. 6.

As noted above, FIG. 6 may represent either a receiver or a transmitter. The amplifier (AMP) 608 is used to amplify a signal from the antenna 310 and provide the amplified signal to the I-path circuitry 450 and the Q-path circuitry 460, in one embodiment. The AMP 608 is an LNA (such as LNA 408 of FIG. 4), in one embodiment. The AMP 608 is used to combine and amplify an I-path signal from the I-path circuitry 450 and a Q-path signal from the Q-path circuitry 460, in one embodiment. The AMP 608 is a power pre-amplifier (such as PPA 512 of FIG. 5), in one embodiment.

The control circuit 610 is configured to sample one or more signals in order to determine an I/Q imbalance. The control circuit 610 could sample the signals from various locations in the apparatus. The control circuit 610 samples an RF signal from the antenna 310, in one embodiment in which the apparatus is a transmitter. The control circuit 610 samples signals that are output from each of the analog filters 606a, 606b, in one embodiment. The control circuit 610 samples signals from the I/O imbalance compensation circuit 430, in one embodiment in which the apparatus is a receiver.

The control circuit 610 sends a calibration signal through the I-path circuitry 450 and the Q-path circuitry 460 and then samples a signal in order to determine an I/Q imbalance. This calibration is done when there is a mismatch between the analog filters 606a, 608b. The control circuit 610 determines a value for each of one or more coefficients for the I/Q imbalance compensation circuit 430 that can compensate for this I/Q imbalance. The control circuit 610 determines a frequency dependent coefficient, in one embodiment. The control circuit 610 determines a frequency dependent coefficient and a frequency independent coefficient, in one embodiment.

However, these one or more coefficients are not applied to the I/Q imbalance compensation circuit 430, in one embodiment. Instead, the control circuit 610 determines a coarse filter adjustment based on the value for the one or more coefficients. For example, the coarse filter adjustment may be based on a correlation between a coefficient and mismatch between the analog filters 606a, 608b. The coarse filter adjustment may adjust any characteristic of an analog filter such as, but not limited to, a cutoff frequency and/or gain.

The control circuit 610 then applies the coarse filter adjustment to one or both of the analog filters 606a, 606b. This coarse filter adjustment reduces the mismatch between the analog filters 606a, 606b. This coarse filter adjustment may also reduce the I/Q imbalance. The control circuit 610 determines the I/Q imbalance again with the coarse filter adjustment applied to one or both of the analog filters 606a, 606b. The control circuit 610 determines a value for each of one or more coefficients for the I/Q imbalance compensation circuit 430 that can compensate for this "fine" I/Q imbalance. The control circuit 610 determines a frequency dependent coefficient and a frequency independent coefficient, in one embodiment. The control circuit 610 then operates the I/Q imbalance compensation circuit 430 with the values for these coefficients while processing an I-path signal with the I-path circuitry 450 with the analog filter 606a and a Q-path signal in with the Q-path circuitry 460. This includes filtering the I-path signal with analog filter 606a and filtering the Q-path signal with analog filter 606b. The control circuit 610 and the I/Q imbalance compensation circuit 430 may each be implemented in hardware, software, or a combination of hardware and software.

Figure 7:
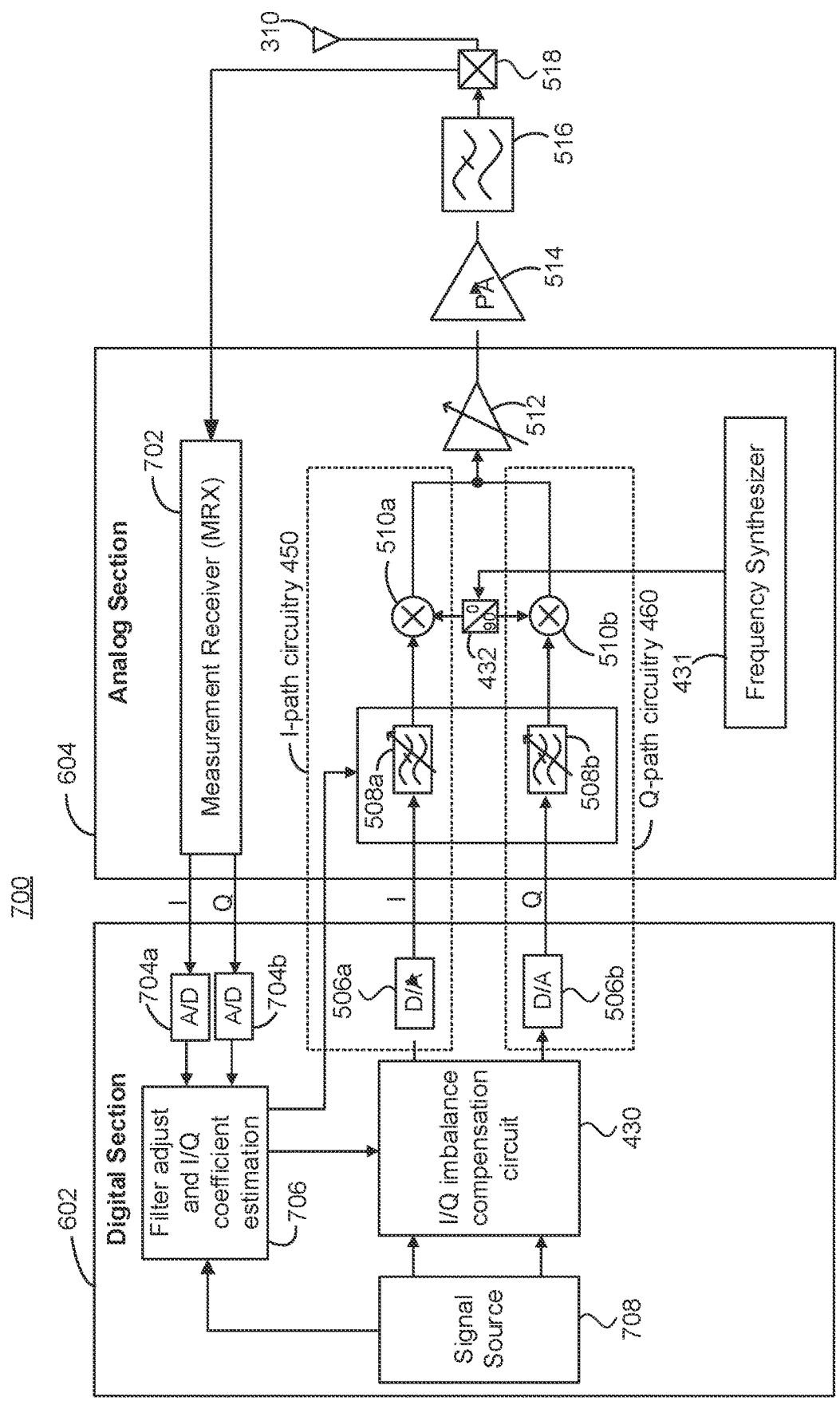
FIG. 7 is a diagram of one embodiment of a transmitter that is configured to compensate for I/Q imbalance.

FIG. 7 is a diagram of one embodiment of a transmitter 700. The transmitter 700 can be the transmitter 202 included in the UE 110 (shown in FIG. 2) or the transmitter 302 included in the BS 170 (shown in FIG. 3), but is not limited thereto. The transmitter 700 shows further details of one embodiment of transmitter 502 (shown in FIG. 5). Elements in transmitter 700 that have the same reference number as those in transmitter 502 will not be discussed in detail. The transmitter 700 has I-path circuitry 450 that includes D/A 506a, analog filter 508a, and frequency mixer 510a. The transmitter 700 has Q-path circuitry 460 that includes D/A 506b, analog filter 508b, and frequency mixer 510b.

The transmitter 700 has circuitry that is configured to compensate for I/Q imbalance. That circuitry includes the I/Q imbalance compensation circuit 430, measurement receiver (MRX) 702, analog-to-digital converter (A/D) 704a, 704b, filter adjust and I/Q coefficient estimation unit 706, and signal source 708. The measurement receiver (MRX) 702, A/D 704a, A/D 704b, filter adjust and I/Q coefficient estimation unit 706, and signal source 708 are one embodiment of the control circuit 610 (shown in FIG. 6).

The signal source 708 is configured to provide a signal to the I/Q imbalance compensation circuit 430. The signal may have a first component that may be used for the I-path signal and a second component that may be used for the Q-path signal. The I/Q imbalance compensation circuit 430 forwards the first I-path signal to D/A 506a and the Q-path signal to D/A 506b. During normal operation, the signal source 708 is configured to provide an I-path signal that is converted to an RF I-path signal by the I-path circuitry 450, and a Q-path signal that is converted to an RF Q-path signal by the Q-path circuitry 460. The PPA 512 combines the RF I-path signal with the RF I-path signal to form an RF signal that is transmitted by antenna 310. The signal source 708 may obtain the I-path signal and the Q-path signal from, for example, the processor 208 of UE 110 of FIG. 2 or processor 308 of BS 170 of FIG. 3.

The transmitter 700 may also have a calibration mode during which the signal source 708 is configured to provide one or more calibration signals to the I/Q imbalance compensation circuit 430. The calibration signals each include a single-tone signal, in one embodiment. A single-tone signal refers to a signal whose power is essentially at a single frequency. Due to non-ideal factors, a single-tone signal may contain energy over a very small range of frequencies. The signal source 708 is capable of generating single-tone signals at different frequencies, in one embodiment. More than one calibration signal can be used (at different times) during the calibration mode in order to provide data for different frequencies. Also, in another embodiment a calibration signal can contain more than one tone. The signal source 708 includes a continuous wave (CW) generator for generating the calibration signals, in one embodiment. The same calibration signal may be processed by the I-path circuitry 450 and the Q-path circuitry 460 to produce an RF calibration signal at the RF output 518. Thus, the I-path circuitry 450 may generate an RF I-calibration signal, whereas the Q-path circuitry 460 may generate an RF Q-calibration signal. If the I-path circuitry 450 and the Q-path circuitry 460 are perfectly matched, then the RF I-calibration signal and the RF Q-calibration signal should have the same magnitude and be exactly 90 degrees out of phase.

Figure 9A:
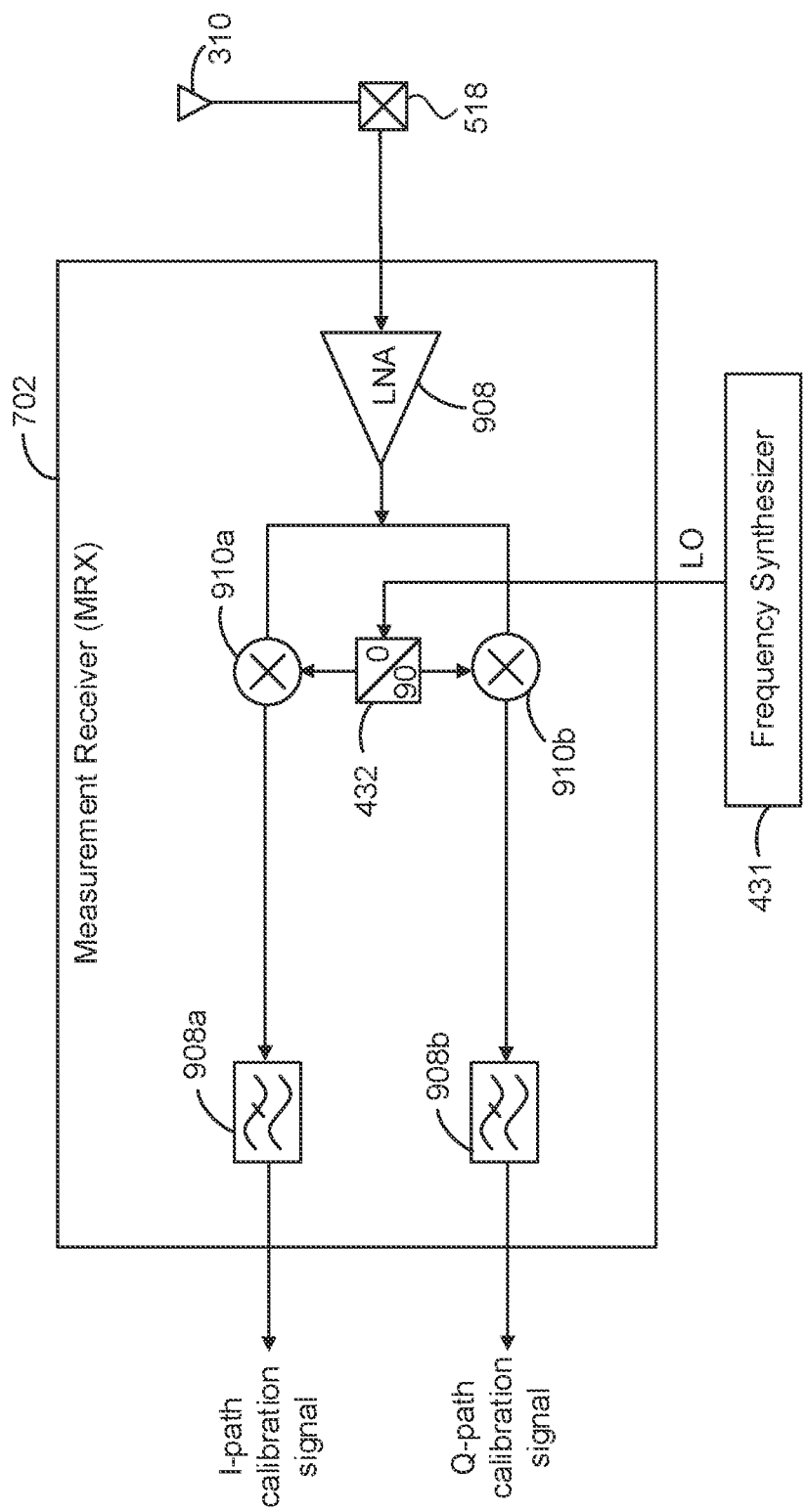
FIG. 9A is a diagram of one embodiment of a measurement receiver (MRX), which may be used in transmitter 700 in FIG. 7.

The measurement receiver (MRX) 702 is configured to sample an RF signal from the RF output 518. The sample may be taken when the transmitter 700 is in the calibration mode. The MRX 702 is configured to separate out an I-path signal and a Q-path signal from the RF signal. The I-path signal is provided to A/D 704a. The Q-path signal is provided to A/D 704b. As noted above, more than one calibration signal may be used during the calibration mode. Thus, the MRX 702 samples an RF signal from the RF output 518 for each calibration signal, in one embodiment. To perform the separation, the MRX 702 may have frequency mixers. One embodiment of an MRX 702 is shown in FIG. 9A, and will be described below.

A/D 704a converts the analog I-path signal to a digital I-path signal, which is provided to the filter adjust and I/Q coefficient estimation unit 706. A/D 704b converts the analog Q-path signal to a digital Q-path signal, which is provided to the filter adjust and I/Q coefficient estimation unit 706. The signal source 708 sends an indication to the filter adjust and I/Q coefficient estimation 706 as to the nature of the calibration signal that corresponds to this pair of I-path signal and Q-path signal. For example, the signal source 708 informs the filter adjust and I/Q coefficient estimation unit 706 as to the frequency of the calibration signal. As noted above, there may be more than one calibration signal to, for example, provide information for different frequencies.

The filter adjust and I/Q coefficient estimation unit 706 is configured to determine an I/Q imbalance based on the I-path signal(s) and the Q-path signal(s) that correspond to the one or more calibration signals. Therefore, this I/Q imbalance could be learned based on data from one or more frequencies of calibration signals. The filter adjust and I/Q coefficient estimation unit 706 determines an amplitude imbalance of the I/Q imbalance, in one embodiment. The amplitude imbalance refers to the difference in amplitude between the I-path signal and the Q-path signal. This difference in amplitude may be due to a mismatch in magnitudes of the transfer functions of the I-path circuitry 450 and the Q-path circuitry 460. The filter adjust and I/Q coefficient estimation unit 706 determines a phase imbalance of the I/Q imbalance, in one embodiment. The phase imbalance refers how phase difference of the I-path signal and Q-path signal deviates from 90 degrees. The phase imbalance may be due to mismatch in the phase of the transfer functions of the I-path circuitry 450 and the Q-path circuitry 460. The filter adjust and I/Q coefficient estimation unit 706 determines both a gain component and a phase component of the I/Q imbalance, in one embodiment.

The filter adjust and I/Q coefficient estimation unit 706 is configured to determine one or more coefficients that may be applied to the I/Q imbalance compensation circuit 430 in order to compensate for the I/Q imbalance. The one or more coefficients include a frequency dependent component, in one embodiment. The one or more coefficients include a frequency independent component, in one embodiment. The one or more coefficients include a frequency dependent component and a frequency independent component, in one embodiment.

However, the one or more coefficients are not necessarily applied to the I/Q imbalance compensation circuit 430 in order to compensate for the I/Q imbalance. Instead, the filter adjust and I/Q coefficient estimation unit 706 may determine a coarse filter adjustment to apply to the analog filters 508a, 508b based on the one or more coefficients. The filter adjust and I/Q coefficient estimation unit 706 determines the coarse filter adjustment based on a correlation between the one or more coefficients and mismatch between the analog filters 508a, 508b.

For the sake of discussion, the mismatch between the analog filters 508a, 508b will be described as a percent mismatch. This could be a percent mismatch in the cutoff frequency, the bandwidth, the gain, or some other characteristic of the analog filters 508a, 508b. Based on empirical data, it may be determined that an x percent mismatch between the analog filters 508a, 508b correlates to a certain set of one or more coefficients. Such correlations may be determined for various sets of coefficients. Thus, depending on what the one or more coefficients were determined to compensate for the I/Q imbalance, an estimate can be made of the mismatch between the analog filters 508*a*, 508*b*. Therefore, a coarse filter adjustment may be determined that is predicted to reduce (or eliminate) this mismatch.

The filter adjust and I/Q coefficient estimation unit 706 is configured to apply the coarse filter adjustment to the analog filters 508*a*, 508*b*. The coarse filter adjustment might reduce a bandwidth mismatch from six percent to one percent. As another example, the coarse filter adjustment might reduce a gain mismatch from eight percent to 1.5 percent. It is not required that the coarse filter adjustment eliminate the mismatch between the analog filters 508*a*, 508*b*.

After the coarse filter adjustment has been made to the analog filters 508*a*, 508*b*, the calibration mode may continue. The signal source 708 may issue one or more additional calibration signals, with the MRX 702 sampling the corresponding RF signals at the RF output 518. The MRX 702 may provide an I-path signal to the A/D 704*a* and a Q-path signal to the A/D 704*b* for each calibration signal. Hence, the filter adjust and I/Q coefficient estimation 706 may determine an I/Q imbalance with the coarse filter adjustment applied to the analog filters 508*a*, 508*b*.

The filter adjust and I/Q coefficient estimation 706 may then determine one or more coefficients that may be applied to the I/Q imbalance compensation circuit 430 in order to compensate for the I/Q imbalance with the coarse filter adjustment applied to the analog filters 508*a*, 508*b*. The coefficients may be the same coefficients as were determined prior to making the coarse filter adjustment applied to the analog filters 508*a*, 508*b*. However, a different set of one or more coefficients may be determined. The one or more coefficients include a frequency dependent coefficient, in one embodiment. The one or more coefficients include a frequency independent coefficient, in one embodiment. The one or more coefficients include a frequency dependent coefficient and a frequency independent coefficient, in one embodiment.

The filter adjust and I/Q coefficient estimation 706 applies the one or more coefficients to the I/Q imbalance compensation circuit 430 during the normal mode of operation. During normal operation, the signal source 708 does not provide a calibration signal. Instead the signal source 708 may provide a signal that is to be communicated from the transmitter 700. This signal may be provided by, for example, the processor 208 of UE 110 of FIG. 2 or processor 308 of BS 170 of FIG. 3. Analog filter 508*a* may process an I-path signal, and analog filter 508*b* may process a Q-path signal. Thus, the I/Q imbalance compensation circuit 430 is operated with values for the one or more coefficients while filtering an I-path signal with analog filter 508*a* and a Q-path signal with analog filter 508*b*.

Figure 8:
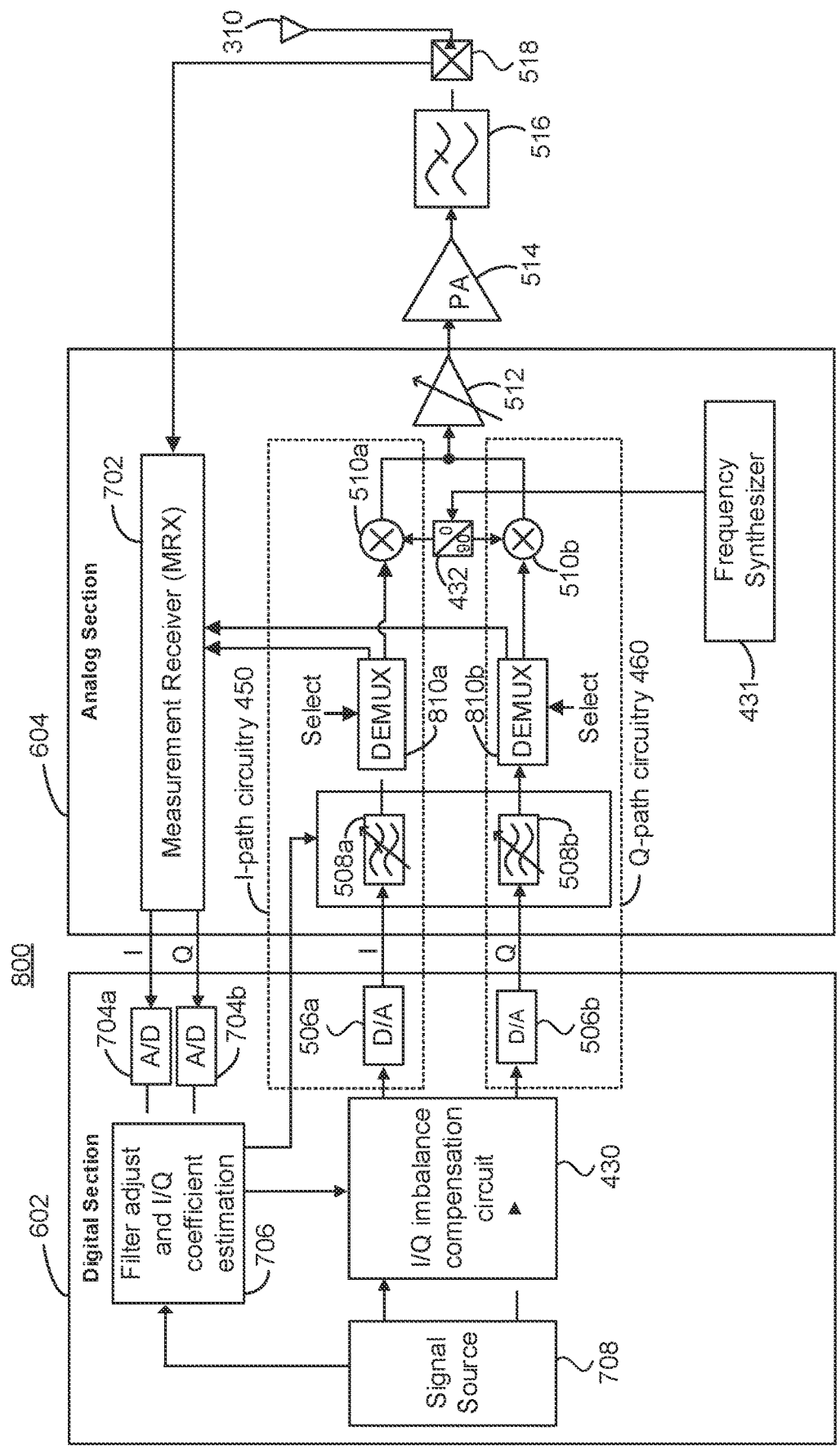
FIG. 8 is a diagram of another embodiment of a transmitter that is configured to compensate for I/Q imbalance.

FIG. 8 is a diagram of one embodiment of a transmitter 800. The transmitter 800 can be the transmitter 202 included in the UE 110 (shown in FIG. 2) or the transmitter 302 included in the BS 170 (shown in FIG. 3), but is not limited thereto. The transmitter 800 shows further details of one embodiment of transmitter 502 (shown in FIG. 5).

Transmitter 800 is similar to transmitter 700, but adds two demultiplexers (DEMUX) 810*a*, 810*b*. DEMUX 810*a* and DEMUX 810*b* may be used to allow the MRX 702 to sample signals directly from the outputs of the analog filters 508*a*, 508*b*. DEMUX 810*a* has an input connected to the analog filter 508*a* in the I-path circuitry 450. DEMUX 810*a* has a first output connected to frequency mixer 510*a* and a second output connected to the MRX 702. A select signal is provided to DEMUX 810*a* to select one of the outputs. Thus, the signal from the analog filter 508*a* may be provided to either the MRX 702 or to frequency mixer 510*a*. By selecting the output that is connected to the MRX 702, the MRX is able to sample the signal that is output from analog filter 508*a*.

DEMUX 810*b* has an input connected to the analog filter 508*b* in the Q-path circuitry 460. DEMUX 810*b* has a first output connected to frequency mixer 510*b* and a second output connected to the MRX 702. A select signal is provided to DEMUX 810*b* to select one of the outputs. Thus, the signal from the analog filter 508*b* may be provided to either the MRX 702 or to frequency mixer 510*b*. By selecting the output that is connected to the MRX 702, the MRX is able to sample the signal that is output from analog filter 508*b*.

Figure 9B:
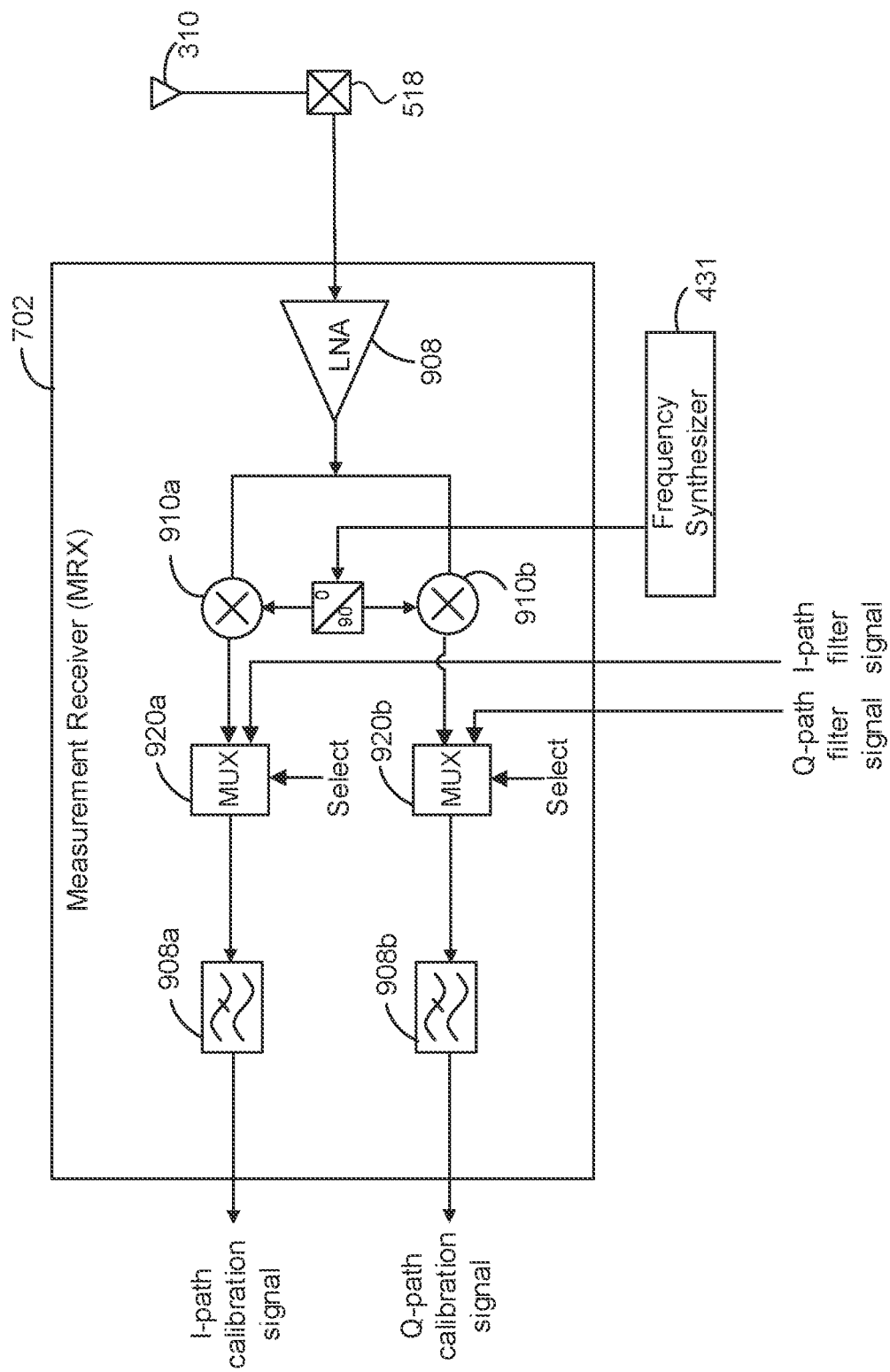
FIG. 9B is a diagram of one embodiment of the MRX, which may be used in transmitter 800 in FIG. 8.

FIG. 9B, which will be discussed below, shows an MRX 702 that may be used to implement the MRX in transmitter 800. Operation of transmitter 800 may be similar to transmitter 700, and hence will not be described in detail.

FIG. 9A is a diagram of one embodiment of the MRX 702, which may be used in transmitter 700. The MRX 702 has a low noise amplifier (LNA) 908 that inputs an RF signal from the RF output 518. The LNA 908 amplifies the RF signal and provides the amplified RF signal to a first frequency mixer 910*a* and a second frequency mixer 910*b*. The first frequency mixer 910*a* receives an in-phase LO signal. The second frequency mixer 910*b* receives a quadrature-phase LO signal. The frequency of the LO signal is equal to the frequency of the LO signal that is used in the transmitter 700, in one embodiment. Each frequency mixer 910*a*, 910*b* may shift (e.g., decrease) a frequency of the RF signal by a frequency of the LO signal to create the new signal. Frequency mixer 910*a* creates an I-path signal, which is provided to low pass filter 908*a*. The low pass filter 908*a* may provide the I-path signal to A/D 704*a* (see FIG. 7). Frequency mixer 910*b* creates a Q-path signal, which is provided to low pass filter 908*b*. The low pass filter 908*b* may provide the Q-path signal to A/D 704*b* (see FIG. 7).

The frequency synthesizer 431 that is depicted in FIG. 9A may be the frequency synthesizer 431 that is in the transmitter 700. Also, it is not required that the MRX 702 contain its own quadrature generator 432, as the quadrature generator 432 from the transmitter 700 may provide the in-phase LO signal and the quadrature-phase LO signal.

FIG. 9B is a diagram of one embodiment of the MRX 702, which may be used in transmitter 800. The MRX 702 is similar to the one depicted in FIG. 9A, but in addition contains multiplexer (MUX) 920*a* and MUX 920*b*. MUX 920*a* receives the I-path signal from frequency mixer 910*a*. MUX 920*a* also receives the signal from analog filter 508*a* (through DEMUX 810*a*). A select signal determines which of these inputs is provided to low pass filter 908*a*. MUX 920*b* receives the Q-path signal from frequency mixer 910*b*. MUX 920*b* also receives the signal from analog filter 508*b* (through DEMUX 810*b*). A select signal determines which of these inputs is provided to low pass filter 908*b*. Therefore, the MRX 702 is able to sample either the RF signal at the RF output 518 or sample signals from the outputs of the analog filters 508*a*, 508*b*.

Figure 10:
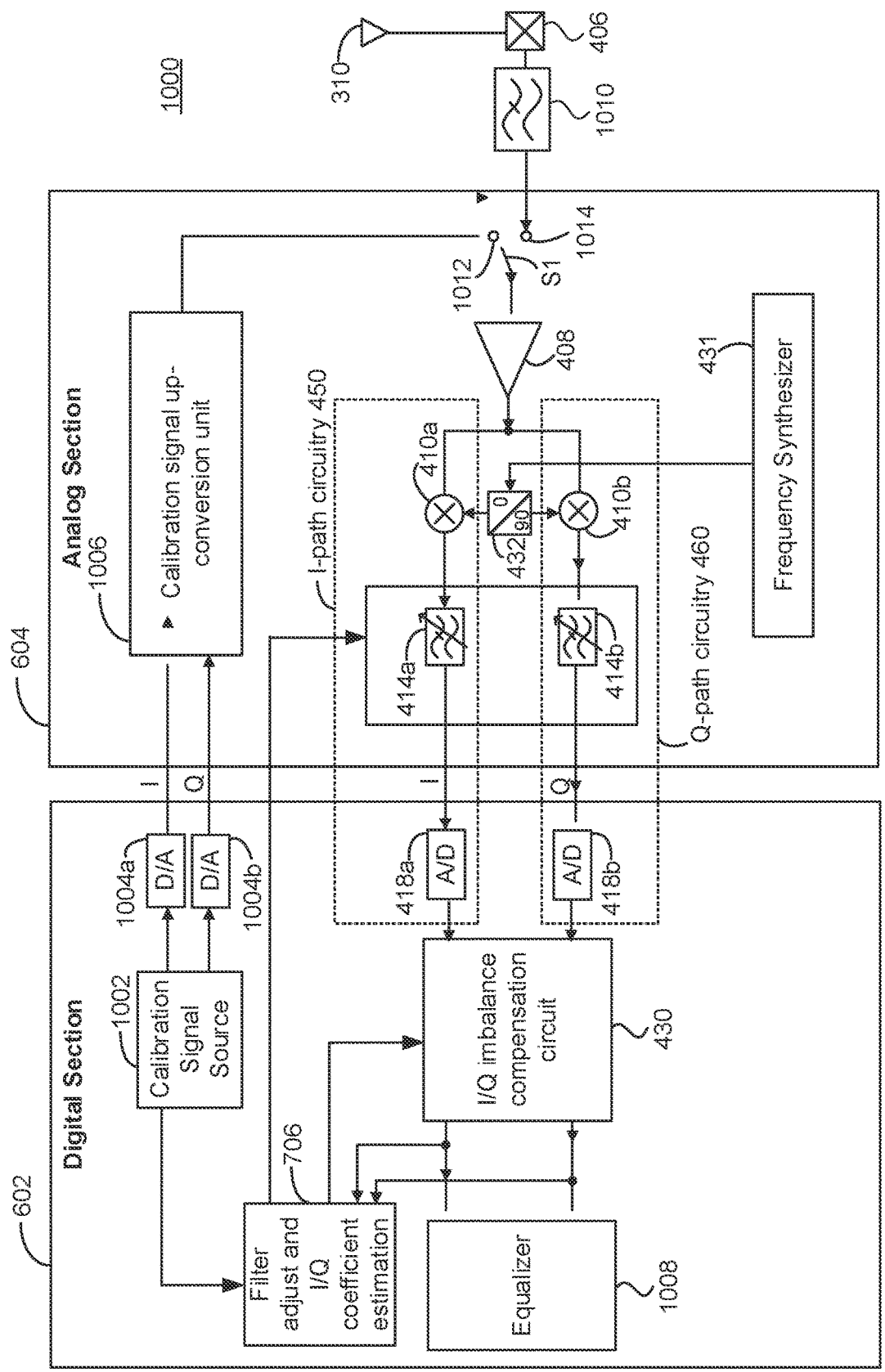
FIG. 10 is a diagram of one embodiment of a receiver that is configured to compensate for I/Q imbalance.

FIG. 10 is a diagram of one embodiment of a receiver 1000. The receiver 1000 can be the receiver 204 included in the UE 110 (shown in FIG. 2) or the receiver 304 included in the BS 170 (shown in FIG. 3), but is not limited thereto. The receiver 1000 shows further details of one embodiment of receiver 404 (shown in FIG. 4). Elements in receiver 1000 that have the same reference number as those in receiver 404 will not be discussed in detail. The receiver 1000 has I-path circuitry 450 that includes A/D 418*a*, analog filter 414*a*, and frequency mixer 410*a*. The transmitter 700 has Q-path circuitry 460 that includes A/D 418*b*, analog filter 414*b*, and frequency mixer 410*b*.

The receiver 1000 has circuitry that is configured to compensate for I/Q imbalance. That circuitry includes the I/Q imbalance compensation circuit 430, calibration signal source 1002, digital-to-analog converter (D/A) 1004*a*, D/A 1004*b*, calibration signal up-conversion, and filter adjust and I/Q coefficient estimation 706. The calibration signal source 1002, digital-to-analog converter (D/A) 1004*a*, D/A 1004*b*, calibration signal up-conversion, and filter adjust and I/Q coefficient estimation 706 are one embodiment of control circuit 610 (shown in FIG. 6).

The calibration signal source 1002 is configured to provide a signal to D/A 1004*a* and to D/A 1004*b*. The signal may have an I-path signal that may be processed by the I-path circuitry 450 and a Q-path signal that may be processed by the Q-path circuitry 460. The calibration signal source 1002 may be used to provide one or more calibration signals during a calibration mode. The calibration signals include a single-tone signal, in one embodiment. A single-tone signal refers to a signal whose power is essentially at a single frequency. Due to non-ideal factors, a single-tone signal may contain energy over a very small range of frequencies. The signal source 708 is capable of generating single-tone signals at different frequencies, in one embodiment. More than one calibration signal can be used (at different times) during the calibration mode in order to provide data for different frequencies. Also, a calibration signal can contain more than one tone. The calibration signal source 1002 includes a continuous wave (CW) generator for generating the calibration signals, in one embodiment.

D/A 1004*a* provides the analog version of the I-path calibration signal to the calibration signal up-conversion unit 1006. D/A 1004*b* provides the analog version of the Q-path calibration signal to the calibration signal up-conversion unit 1006.

Figure 11:
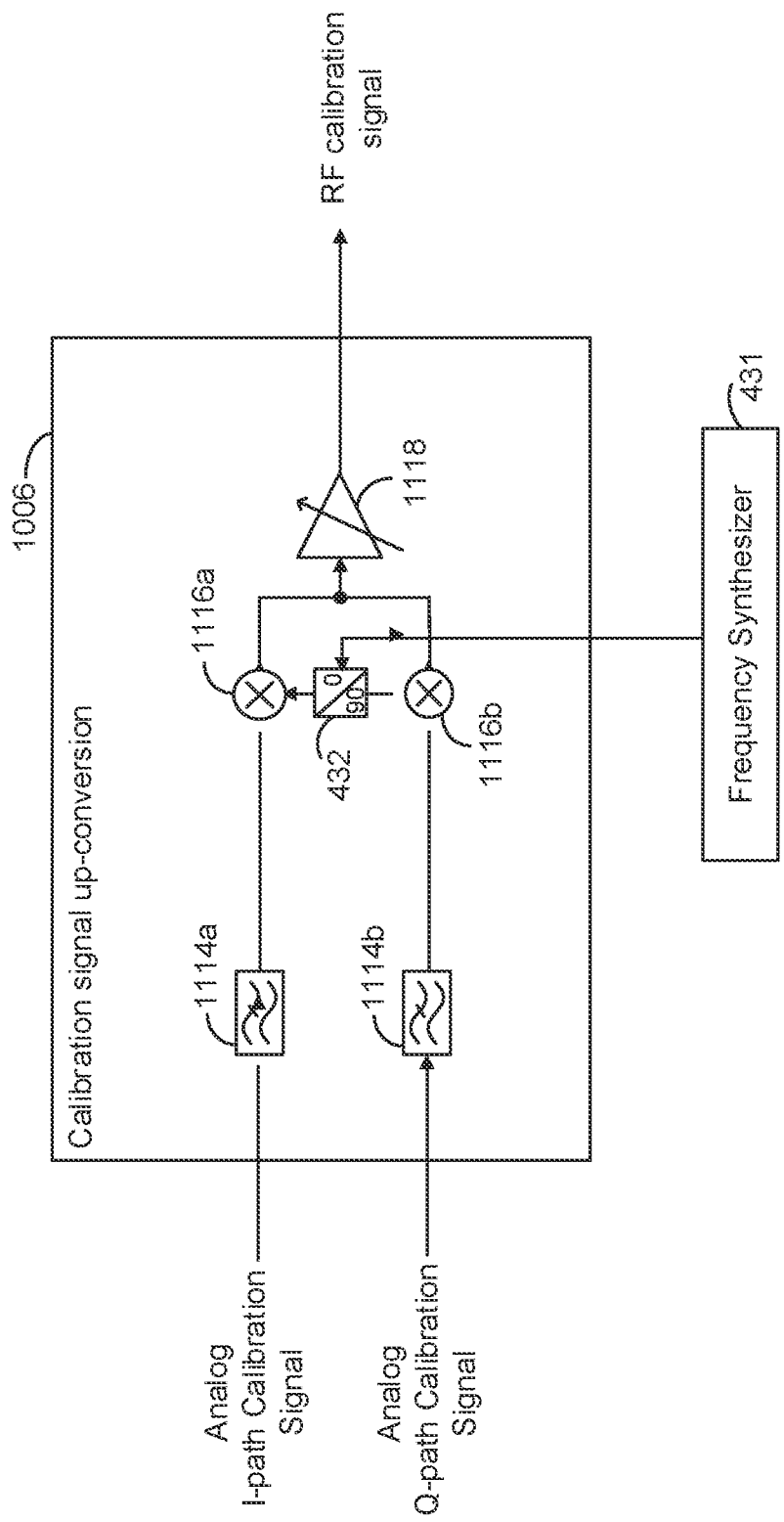
FIG. 11 is a diagram of one embodiment of calibration signal up-conversion, which may be used in receiver 1000 of FIG. 10.

The calibration signal up-conversion unit 1006 is configured to frequency up-convert the I-path calibration signal and to frequency up-convert the Q-path calibration signal and to form an RF calibration signal by combining the up-converted signals. Low noise amplifier (LNA) 408 has its input connected to switch S1 in order to connect LNA 408 to either calibrate terminal 1012 or normal terminal 1014. The RF calibration signal is provided by the calibration signal up-conversion unit 1006 to calibrate terminal 1012. The RF input 406 passes an RF input signal (if present) to filter 1010, which is connected to normal terminal 1014. Therefore, LNA 408 can receive either the RF calibration signal from the calibration signal up-conversion unit 1006 during a calibration mode of operation or an RF signal during a normal mode of operation. FIG. 11, to be described below, shows one embodiment of the calibration signal up-conversion unit 1006.

After the I-path circuitry 450 processes the I-path calibration signal, A/D 418*a* provides a digital version of the I-path calibration signal to the I/Q imbalance compensation circuit 430. After the Q-path circuitry 460 components process the Q-path calibration signal, A/D 418*b* provides a digital version of the Q-path calibration signal to the I/Q imbalance compensation circuit 430. The I/Q imbalance compensation circuit 430 provides the digital version of the I-path calibration signal and the digital version of the Q-path calibration signal to the filter adjust and I/Q coefficient estimation 706. The signal source 708 sends an indication to the filter adjust and I/Q coefficient estimation 706 as to the nature of the calibration signal that corresponds to this pair of I-path calibration signal and Q-path calibration signal. For example, the signal source 708 informs the filter adjust and I/Q coefficient estimation 706 as to the frequency of the calibration signal. As noted above, there may be more than one calibration signal to, for example, provide information for different frequencies.

The filter adjust and I/Q coefficient estimation 706 is configured to determine an I/Q imbalance based on the I-path calibration signal(s) and the Q-path calibration signal(s) that correspond to the one or more calibration signals. Therefore, this I/Q imbalance could be learned based on data from one or more frequencies of calibration signals. The filter adjust and I/Q coefficient estimation 706 determines a gain component of the I/Q imbalance, in one embodiment. The gain component may be due to the difference in gain between the I-path circuitry 450 of the Q-path circuitry 460. The filter adjust and I/Q coefficient estimation 706 determines a phase component of the I/Q imbalance, in one embodiment. The filter adjust and I/Q coefficient estimation 706 determines both a gain component and a phase component of the I/Q imbalance, in one embodiment.

The filter adjust and I/Q coefficient estimation 706 is configured to determine one or more coefficients that may be applied to the I/Q imbalance compensation circuit 430 in order to compensate for the I/Q imbalance. The one or more coefficients include a frequency dependent component, in one embodiment. The one or more coefficients include a frequency independent component, in one embodiment. The one or more coefficients include a frequency dependent component and a frequency independent component, in one embodiment.

However, the one or more coefficients are not necessarily applied to the I/Q imbalance compensation circuit 430 in order to compensate for the I/Q imbalance. Instead, the filter adjust and I/Q coefficient estimation 706 may determine a coarse filter adjustment to apply to the analog filters 414*a*, 414*b* based on the one or more coefficients. The filter adjust and I/Q coefficient estimation 706 determines the coarse filter adjustment based on a correlation between the one or more coefficients and mismatch between the analog filters 414*a*, 414*b*.

For the sake of discussion, the mismatch between the analog filters 414*a*, 414*b* will be described as a percent mismatch. This could be a percent mismatch in the cutoff frequency, the bandwidth, the gain, or some other characteristic of the analog filters 414*a*, 414*b*. Based on empirical data, it may be determined that an x percent mismatch between the analog filters 414*a*, 414*b* correlates to a certain set of one or more coefficients. Such correlations may be determined for various sets of coefficients. Thus, depending on what the one or more coefficients were determined to compensate for the I/Q imbalance, an estimate can be made of the mismatch between the analog filters 414*a*, 414*b*. Therefore, a coarse filter adjustment may be determined that is predicted to reduce (or eliminate) this mismatch.

The filter adjust and I/Q coefficient estimation 706 is configured to apply the coarse filter adjustment to the analog filters 414*a*, 414*b*. The coarse filter adjustment might reduce a bandwidth mismatch from six percent to one percent. As another example, the coarse filter adjustment might reduce a gain mismatch from eight percent to 1.5 percent. It is not required that the coarse filter adjustment eliminate the mismatch between the analog filters 414*a*, 414*b*.

After the coarse filter adjustment has been made to the analog filters 414*a*, 414*b*, the calibration mode may continue. The signal source 708 may issue one or more additional calibration signals, with the calibration signal up-conversion unit 1006 up-converting the frequency of each calibration signal to form an RF calibration signal, as has been previously described. The filter adjust and I/Q coefficient estimation 706 may determine an I/Q imbalance with the coarse filter adjustment applied to the analog filters 414a, 414b.

The filter adjust and I/Q coefficient estimation 706 may then determine one or more coefficients that may be applied to the I/Q imbalance compensation circuit 430 in order to compensate for the I/Q imbalance with the coarse filter adjustment applied to the analog filters 414a, 414b. The coefficients may be the same coefficients as were determined prior to making the coarse filter adjustment applied to the analog filters 414a, 414b. However, a different set of one or more coefficients may be determined. The one or more coefficients include a frequency dependent component, in one embodiment. The one or more coefficients include a frequency independent component, in one embodiment. The one or more coefficients include a frequency dependent component and a frequency independent component, in one embodiment.

The filter adjust and I/Q coefficient estimation 706 applies the one or more coefficients to the I/Q imbalance compensation circuit 430 during the normal mode of operation. During normal operation, the signal source 708 does not provide a calibration signal. Instead the LNA 408 may receive an RF signal from filter 1010. The I-path circuitry 450 and the Q-path circuitry 460 then process the RF signal that came from the RF input 406. Thus, the I/Q imbalance compensation circuit 430 is operated with values for the one or more coefficients while filtering an I-path signal with analog filter 414a and a Q-path signal with analog filter 414b.

During the normal mode, the I/Q imbalance compensation circuit 430 may pass the I-path signal and the Q-path signal (after applying compensation for I/Q imbalance) to the equalizer 1008, or to other components.

FIG. 11 is a diagram of one embodiment of the calibration signal up-conversion unit 1006, which may be used in receiver 1000. First low pass filter 1114a filters the analog I-path calibration signal (which may be provided by D/A 1004a). Second low pass filter 1114b filters the analog Q-path calibration signal (which may be provided by D/A 1004b).

First frequency mixer 1116a receives the filtered I-path calibration signal from the low pass filter 1114a. First frequency mixer 1116a also receives an in-phase LO signal. Second frequency mixer 1116b receives the filtered Q-path calibration signal from the low pass filter 1114b. Second frequency mixer 1116b also receives a quadrature-phase LO signal. Each frequency mixer 1116a, 1116b may shift (e.g., increase) a frequency of the calibration signal by a frequency of the LO signal to create the new signal. The adjustable gain amplifier 1118 receives and combines the signals from mixers 1116a and 1116b to generate an RF calibration signal. The RF calibration signal may be provided to terminal 1012, such that switch S1 can provide the RF calibration signal to the LNA 408 (see FIG. 10).

Figure 12:
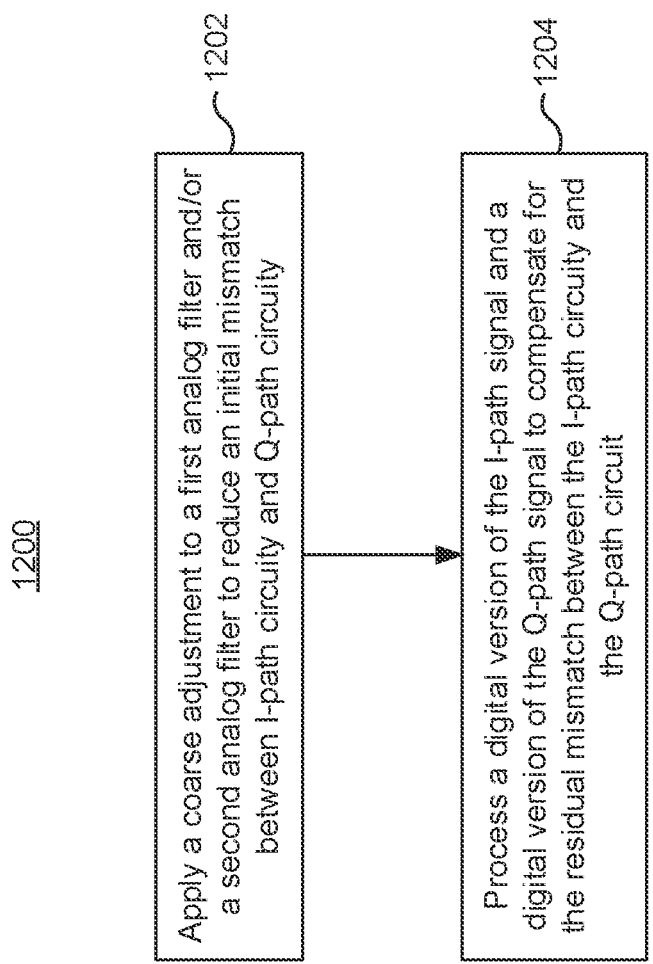
FIG. 12 is a flowchart of one embodiment of a process of compensating for I/Q imbalance.

FIG. 12 is a flowchart of one embodiment of a process 1200 of compensating for I/Q imbalance. The process 1200 is used to compensate for I/Q imbalance in an RF transmitter, in one embodiment. The process 1200 is used to compensate for I/Q imbalance in an RF receiver, in one embodiment. The process 1200 may be performed in, but is not limited to, user equipment 110, base station 170, receivers 404, 1000, transmitters 502, 700, 800, or apparatus 600.

Step 1202 includes applying the coarse filter adjustment to at least one of a first analog filter or a second analog filter. The first analog filter is in the I-path circuitry 450. The second analog filter is in the Q-path circuitry 460. The first and second analog filters are counterparts, in one embodiment. For example, the first analog filter and the second analog filter may be any of, but are not limited to, the following counterparts: analog filters 414a and 414b, analog filters 508a and 508b, or analog filters 606a and 606b. The coarse filter adjustment reduces an initial mismatch between the first analog filter and the second analog filter, in one embodiment. Therefore, the coarse filter adjustment reduces an initial mismatch between the I-path circuitry and the Q-path circuitry, in one embodiment.

The coarse filter adjustment adjusts a bandwidth of the first analog filter and/or the second analog filter to reduce a bandwidth mismatch between the first analog filter and the second analog filter, one embodiment. The coarse filter adjustment adjusts a cutoff frequency of a low pass filter of the first analog filter and/or the second analog filter to reduce a cutoff frequency mismatch between the first analog filter and the second analog filter, in one embodiment. The coarse filter adjustment adjusts a gain of the first analog filter and/or the second analog filter to reduce a gain mismatch between the first analog filter and the second analog filter, in one embodiment. The gain adjustment is frequency dependent, in one embodiment. By a frequency dependent gain adjustment, it is meant that the amount of adjustment to the gain depends on frequency. Other adjustments can be made to the first analog filter and/or the second analog filter to reduce a mismatch between the first analog filter and the second analog filter.

Step 1204 includes processing a digital version of the I-path signal and a digital version of the Q-path signal to compensate for the residual mismatch between the I-path circuitry and the Q-path circuit. Step 1204 is performed with the coarse adjustment applied to the first analog filter and the second analog filter, in one embodiment. The first analog filter filters an I-path signal while the second analog filter filters a Q-path signal, in one embodiment. Step 1204 may include operating the I/Q imbalance compensation circuit 430 to compensate for residual mismatch between the I-path circuitry 450 and the Q-path circuitry 460 with the coarse adjustment applied to the first analog filter and the second analog filter. The I/Q imbalance compensation circuit 430 processes a digital version of the I-path signal and a digital version of the Q-path signal to compensate for mismatch between the I-path circuitry and the Q-path circuitry while the analog filters filter the respective I-path signal and Q-path signal, in one embodiment. Note that each of the I-path signal and the Q-path signal are time varying signals, in one embodiment. Hence, it will be understood that the I/Q imbalance compensation circuit 430 and the analog filters may concurrently operate on different portions of the I-path signal and Q-path signal.

Figure 13:
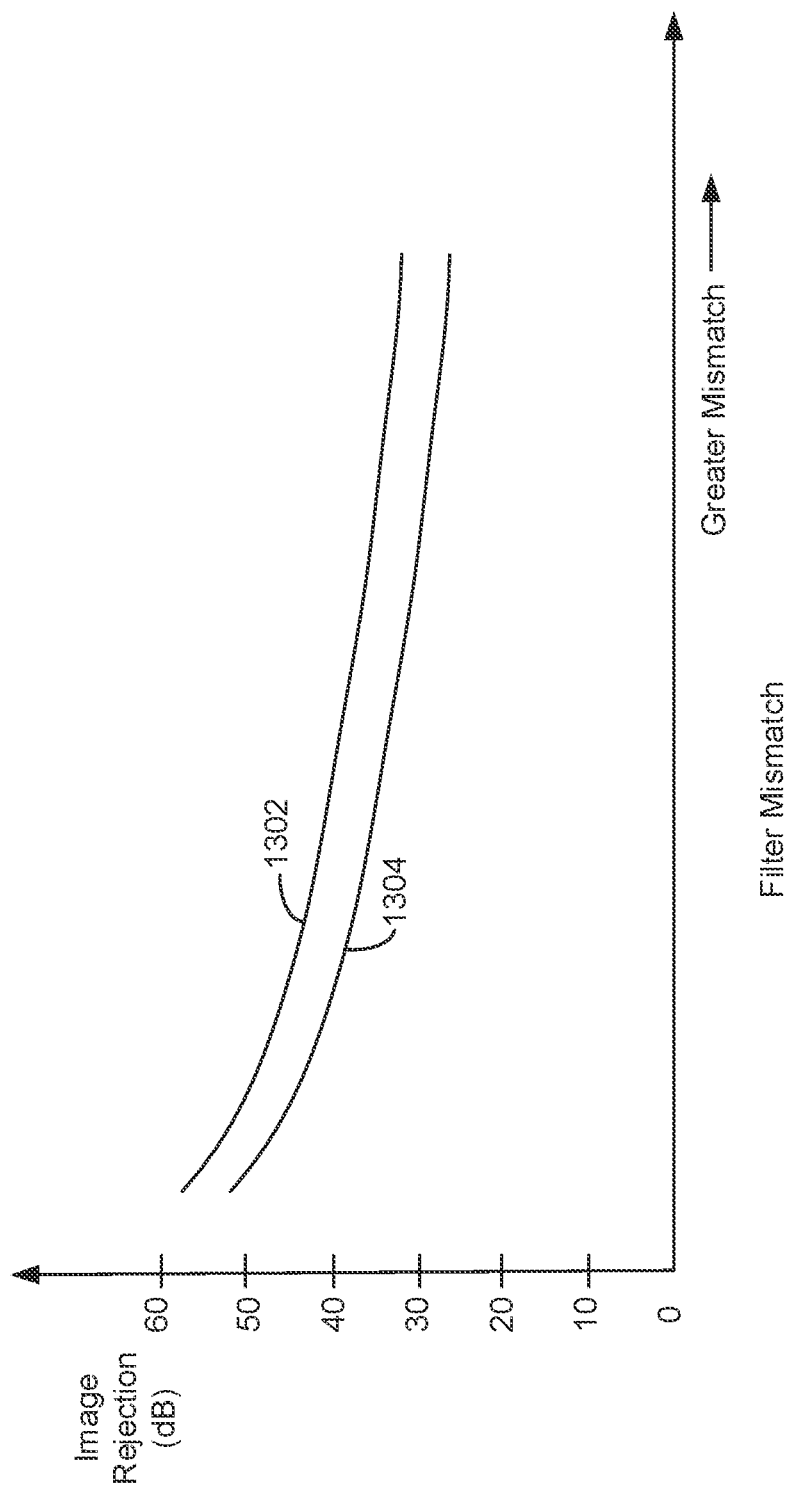
FIG. 13 is a graph to depict how the amount of filter mismatch may impact the ability to compensate for I/Q imbalance.

FIG. 13 is a graph to depict how the amount of filter mismatch may impact the ability of the I/Q imbalance compensation circuit 430 to compensate for I/Q imbalance. The horizontal axis represents the amount of filter mismatch. The vertical axis represents the amount of image rejection that may be achieved with an example I/Q imbalance compensation circuit having only two-taps. It is desirable to have more image rejection to be able to better compensate for I/Q imbalance. Curve 1302 is for a third order Butterworth filter. Curve 1304 is for a third order Chebyshev filter. For the third order Chebyshev filter, the example I/Q imbalance compensation circuit provides about 30 dB of image rejection when the mismatch between the I-path filter and the Q-path filter is severe. For the third order Chebyshev filter, the example I/Q imbalance compensation circuit provides about 50 dB of image rejection when the mismatch between the I-path filter and the Q-path filter is reduced to a low mismatch. For the third order Butterworth filter, the example I/Q imbalance compensation circuit provides about 35 dB of image rejection when the mismatch between the I-path filter and the Q-path filter is severe. For the third order Butterworth filter, the example I/Q imbalance compensation circuit provides nearly 60 dB of image rejection when the mismatch between the I-path filter and the Q-path filter is reduced to a low mismatch. The exact amount of image rejection will depend on the implementation of the I/Q imbalance compensation circuit, as well as the number of taps.

Note that in each case, a relatively simple two-tap I/Q imbalance compensation circuit can provide much better image rejection (and hence better compensation for I/Q imbalance) when the mismatch between the I-path filter and the Q-path filter is reduced. Therefore, process 1200 can provide very good compensation for I/Q imbalance by first reducing an initial mismatch between the I-path filter and the Q-path filter with a coarse adjustment. Moreover, the I/Q imbalance compensation circuit 430 used in process 1200 does not need to have a large number of taps to provide I/Q imbalance compensation circuit. In one embodiment, a two-tap I/Q imbalance compensation circuit 430 provides very good I/Q imbalance compensation. However, more taps could be used if greater I/Q imbalance compensation is desired.

Figure 14:
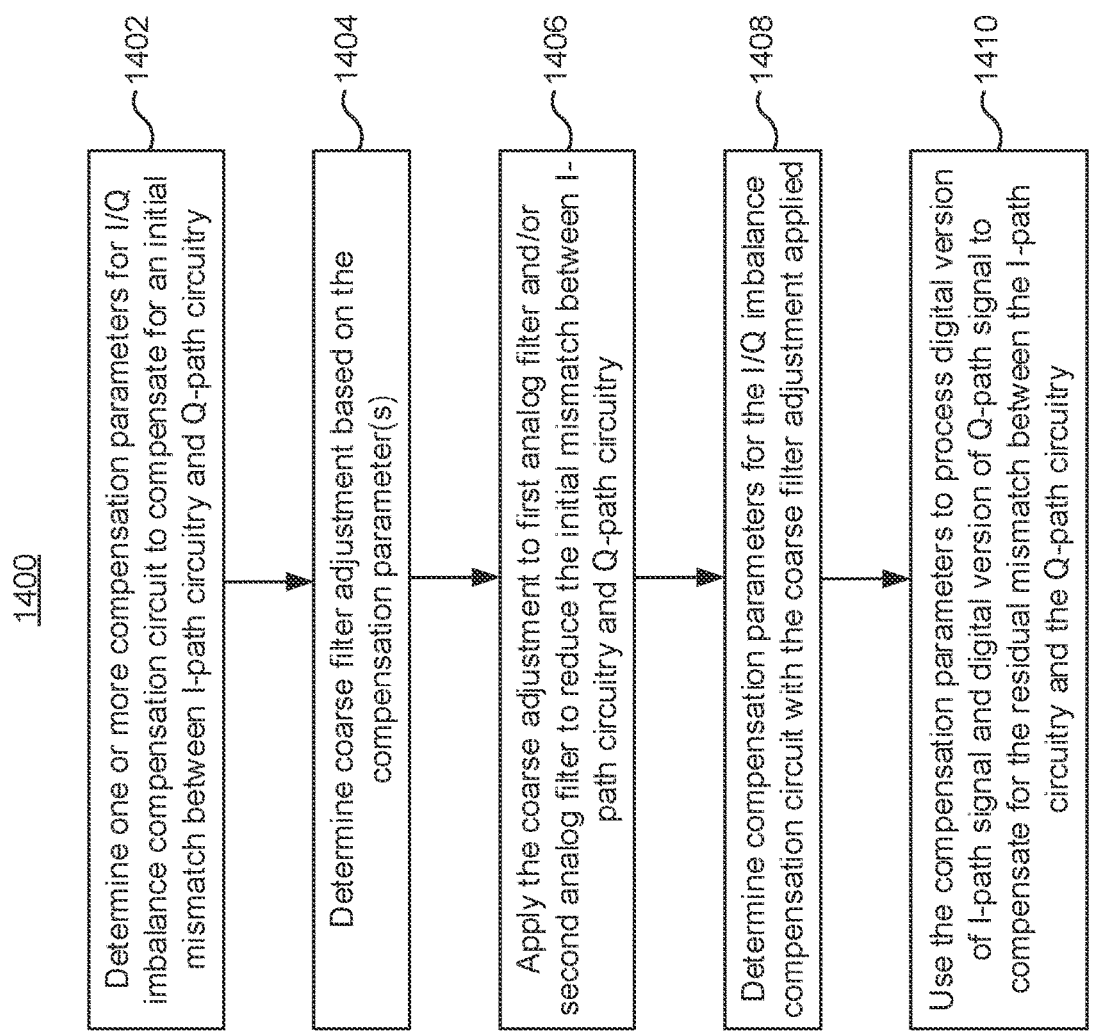
FIG. 14 is a flowchart of another embodiment of a process of compensating for I/Q imbalance.

FIG. 14 is a flowchart of one embodiment of a process 1400 of compensating for I/Q imbalance. The process 1400 is used to compensate for I/Q imbalance in an RF transmitter, in one embodiment. The process 1400 is used to compensate for I/Q imbalance in an RF receiver, in one embodiment. The process 1400 may be performed in, but is not limited to, user equipment 110, base station 170, receivers 404, 1000, transmitters 502, 700, 800, or apparatus 600. Process 1400 describes further details of one embodiment of process 1200.

Step 1402 includes determining one or more compensation parameters for I/Q imbalance compensation circuit 430 to compensate for an initial mismatch between I-path circuitry 450 and Q-path circuitry 460. The compensation parameter(s) may include a frequency dependent compensation parameter. The compensation parameter(s) may include a frequency independent compensation parameter. The compensation parameter(s) includes both a frequency dependent compensation parameter and a frequency independent compensation parameter. In some embodiments, multiple frequency dependent compensation parameters are determined.

Step 1404 includes determining a coarse filter adjustment based on the compensation parameter(s). The coarse filter adjustment is determined based on a correlation between the compensation parameter(s) and mismatch between the first analog filter and the second analog filter, in one embodiment. For example, based on empirical data, it may be determined that an x percent mismatch between the counterpart analog filters correlates to a certain set of one or more compensation parameters. Such correlations may be determined for various sets of compensation parameters. Thus, depending on what the one or more compensation parameters were determined to compensate for the I/Q imbalance, an estimate can be made of the mismatch between the analog filters. Therefore, a coarse filter adjustment may be determined that is predicted to reduce (or eliminate) this mismatch.

Step 1406 includes applying the coarse filter adjustment to at least one of the first analog filter or the second analog filter. Step 1406 is one embodiment of step 1202 of process 1200. In one embodiment, filter adjust and I/Q coefficient estimation 706 applies the adjustment to the filters.

Step 1408 includes determining compensation parameters for the I/Q imbalance compensation circuit with the coarse filter adjustment applied. Step 1408 may be performed by filter adjust and I/Q coefficient estimation 706.

Step 1410 includes using the compensation parameters from step 1408 to process a digital version of the I-path signal and digital version of the Q-path signal to compensate for the residual mismatch between the I-path circuitry 450 and the Q-path circuitry 460. In one embodiment, filter adjust and I/Q coefficient estimation 706 provides the compensation parameters to I/Q imbalance compensation circuit 430. Step 1410 is one embodiment of step 1204 of process 1200.

Figure 15:
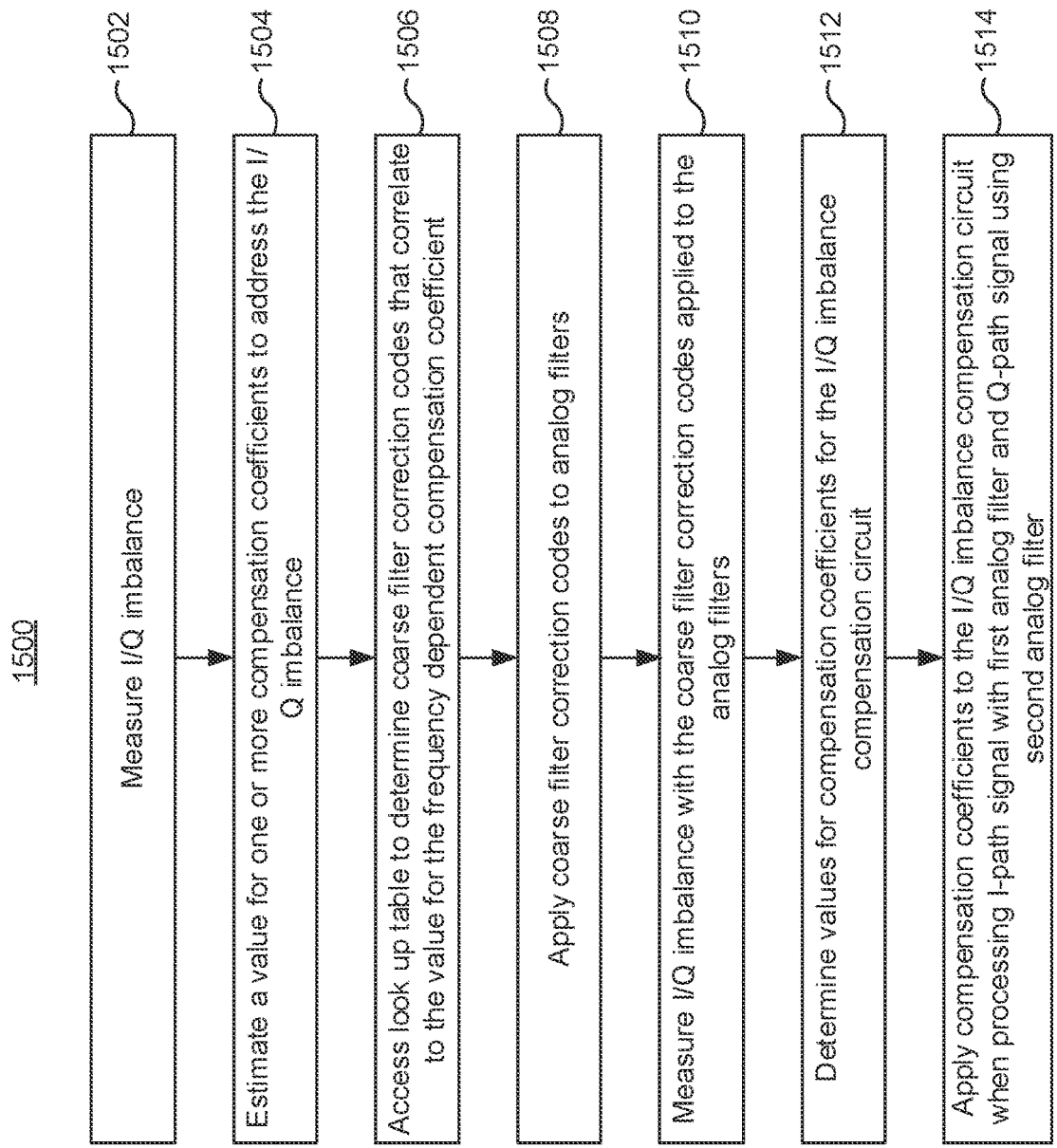
FIG. 15 is a flowchart of still another embodiment of a process of compensating for I/Q imbalance.

FIG. 15 is a flowchart of one embodiment of a process 1500 of compensating for I/Q imbalance. The process 1500 is used to compensate for I/Q imbalance in an RF transmitter, in one embodiment. The process 1500 is used to compensate for I/Q imbalance in an RF receiver, in one embodiment. The process 1500 may be performed in, but is not limited to, user equipment 110, base station 170, receivers 404, 1000, transmitters 502, 700, 800, or apparatus 600. Process 1500 describes further details of one embodiment of process 1200.

Step 1502 includes measuring an I/Q imbalance. Step 1502 may include the signal source 708 issuing a calibration signal. The calibration signal may comprise an I-path path calibration signal and a Q-path calibration signal. Step 1502 may include the MRX 702 sampling the calibration signal after the I-path calibration signal has been processed by at least some of the components in the I-path circuitry 450 and the Q-path calibration signal has been processed by at least some of the components in the Q-path circuitry 460. Components external to the I-path circuitry 450 and the Q-path circuitry 460 may also process the calibration signal.

In one embodiment, the MRX 702 samples an RF calibration signal from the RF output 518. The MRX 702 then forms an I-path calibration signal and a Q-path calibration signal from the RF calibration signal. In one embodiment, DEMUX 810a provides an I-path calibration signal to the MRX 702, and DEMUX 810b provides a Q-path calibration signal to the MRX 702. The MRX 702 then provides the I-path calibration signal and the Q-path calibration signal to the filter adjust and I/Q coefficient estimation, which measures an I/Q imbalance based on the I-path calibration signal and the Q-path calibration signal.

Step 1502 may include the calibration signal source 1002 issuing a calibration signal. The calibration signal may comprise an I-path calibration signal and a Q-path calibration signal. Step 1502 may include the calibration signal up-conversion unit 1006 up-converting the frequency of the I-path calibration signal and the Q-path calibration signal. The calibration signal up-conversion unit 1006 may also form an RF calibration signal from the up-converted I-path calibration signal and the Q-path calibration signal, and provide the RF calibration signal to terminal 1012.

The I/Q imbalance compensation circuit 430 may provide the I-path calibration signal and the Q-path calibration signal to the filter adjust and I/Q coefficient estimation 706 after the I-path calibration signal has been processed by at least some of the components in the I-path circuitry 450 and the Q-path calibration signal has been processed by at least some of the components in the Q-path circuitry 460. Components external to the I-path circuitry 450 and the Q-path circuitry 460 may also process the RF calibration signal.

Step 1504 includes estimating a value for one or more compensation coefficients to address the I/Q imbalance. Step 1504 may be performed by filter adjust and I/Q coefficient estimation 706. A frequency dependent compensation coefficient to address the I/Q imbalance may be determined. A frequency independent compensation coefficient to address the I/Q imbalance may also be determined. Furthermore, more than one frequency dependent compensation coefficient may be determined to address the I/Q imbalance. The one or more compensation coefficients are suitable to apply to the I/Q imbalance compensation circuit 430 to compensate for the I/Q imbalance. However, the compensation coefficients are not necessarily applied to the I/Q imbalance compensation circuit 430 at this time.

Step 1506 includes accessing a lookup table to determine coarse filter correction codes that correlate to the one or more compensation coefficients. The lookup table may be constructed based on empirical data. The correction codes refer to codes that are applied to the counterpart analog filters to adjust some characteristic of the filter. For example, the correction codes may set bandwidths, cutoff frequencies, gains, etc.

Step 1508 includes applying the coarse filter correction codes to analog filters. Step 1508 is one embodiment of step 1202 of process 1200.

Step 1510 includes measuring an I/Q imbalance with the coarse filter correction codes applied to the analog filters. The I/Q imbalance may be measured in a manner similar to step 1502.

Step 1512 includes determining values for compensation coefficients for the I/Q imbalance compensation circuit 430. Step 1502 is performed with the coarse filter correction codes applied to the counterpart analog filters.

Step 1514 includes applying compensation coefficients to the I/Q imbalance compensation circuit 430 when processing an I-path signal with first analog filter and a Q-path signal using second analog filter. Note that the I-path signal and the Q-path signal are not the calibration signal, in one embodiment. The I-path signal and the Q-path signal may be for an RF signal that is being transmitted from a transmitter or for an RF signal that is being received by a receiver.

Figure 16:
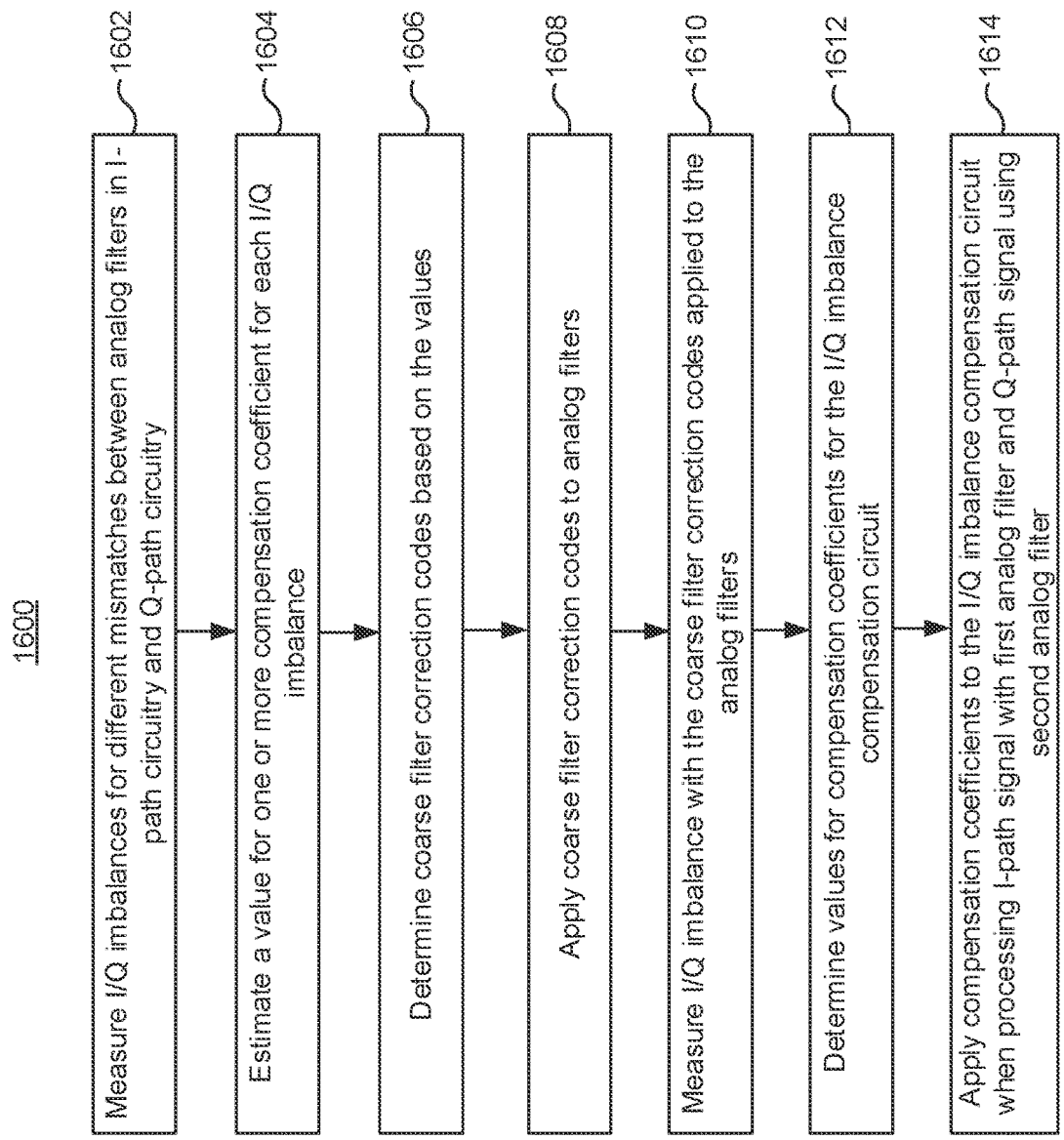
FIG. 16 is a flowchart of still another embodiment of a process of compensating for I/Q imbalance.

FIG. 16 is a flowchart of one embodiment of a process 1600 of compensating for I/Q imbalance. The process 1600 is used to compensate for I/Q imbalance in an RF transmitter, in one embodiment. The process 1600 is used to compensate for I/Q imbalance in an RF receiver, in one embodiment. The process 1600 may be performed in, but is not limited to, user equipment 110, base station 170, receivers 404, 1000, transmitters 502, 700, 800, or apparatus 600. Process 1600 describes further details of one embodiment of process 1200.

Step 1602 includes measuring I/Q imbalances for different mismatches between analog filters in I-path circuitry and Q-path circuitry. Step 1602 may include making an adjustment to one or both of the complimentary analog filters to deliberately create a mismatch between the complimentary analog filters. In one embodiment, step 1602 includes measuring an I/Q imbalance for three different combinations of transfer functions of the complimentary analog filters. For example, one combination is for the present conditions of the complimentary analog filters. A second may be for an adjustment that increases the bandwidth of one of the analog filters. A third may be for an adjustment that decreases the bandwidth of one of the analog filters. A parameter other than bandwidth can be adjusted. The measurement of I/Q imbalances may be similar to step 1502 of process 1500.

Step 1604 includes estimating a value for one or more compensation coefficients for each of the I/Q imbalances. Step 1604 may be similar to step 1504 of process 1500, but determines a value for one or more compensation coefficients for each of the I/Q imbalances.

Figure 17:
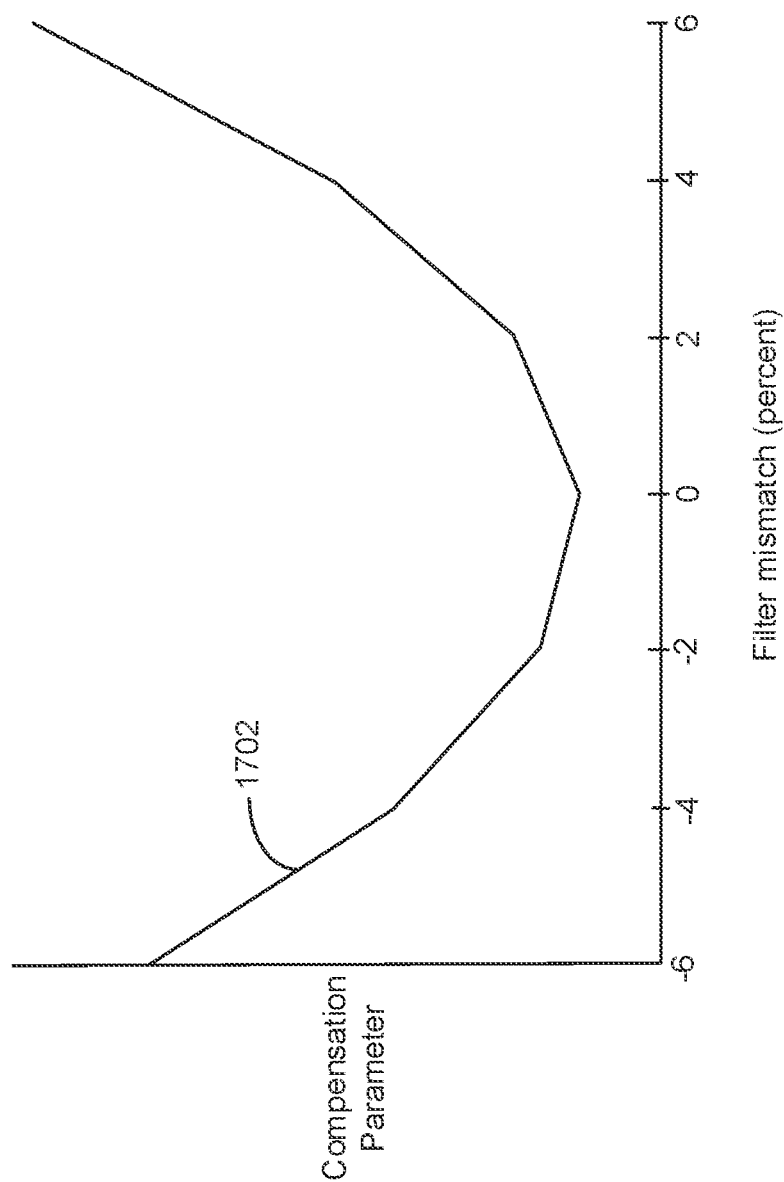
FIG. 17 depicts a curve to show how a compensation parameter may be correlated to a filter mismatch.

Step 1606 includes determining a coarse filter correction code based on the values from step 1604. One technique is to use a lookup table as has been described with respect to step 1506 of process 1500. However, step 1606 is not limited to using a lookup table. FIG. 17 depicts a curve 1702 to show how a compensation parameter may be correlated to a filter mismatch. The horizontal axis represents a mismatch between counterpart analog filters. The mismatch is expressed in percent. The mismatch is bandwidth mismatch, in one embodiment. The vertical axis represents a value of a compensation parameter. Curve 1702 represents a correlation between the filter mismatch and the compensation parameter. This correlation could be determined empirically. The curve 1702 could correlate well to a mathematical function. For example, curve 1702 correlates well to a quadratic function, in one embodiment. Thus, once compensation parameters are learned for different filter mismatches, a quadratic fit can be used to estimate the minimum point on curve 1702.

Step 1608 includes applying the coarse filter correction codes to analog filters. Step 1608 is one embodiment of step 1202 of process 1200.

Step 1610 includes measuring an I/Q imbalance with the coarse filter correction codes applied to the analog filters. The I/Q imbalance may be measured in a manner similar to step 1602.

Step 1612 includes determining values for compensation coefficients for the I/Q imbalance compensation circuit 430. Step 1602 is performed with the coarse filter correction codes applied to the counterpart analog filters.

Figure 18:
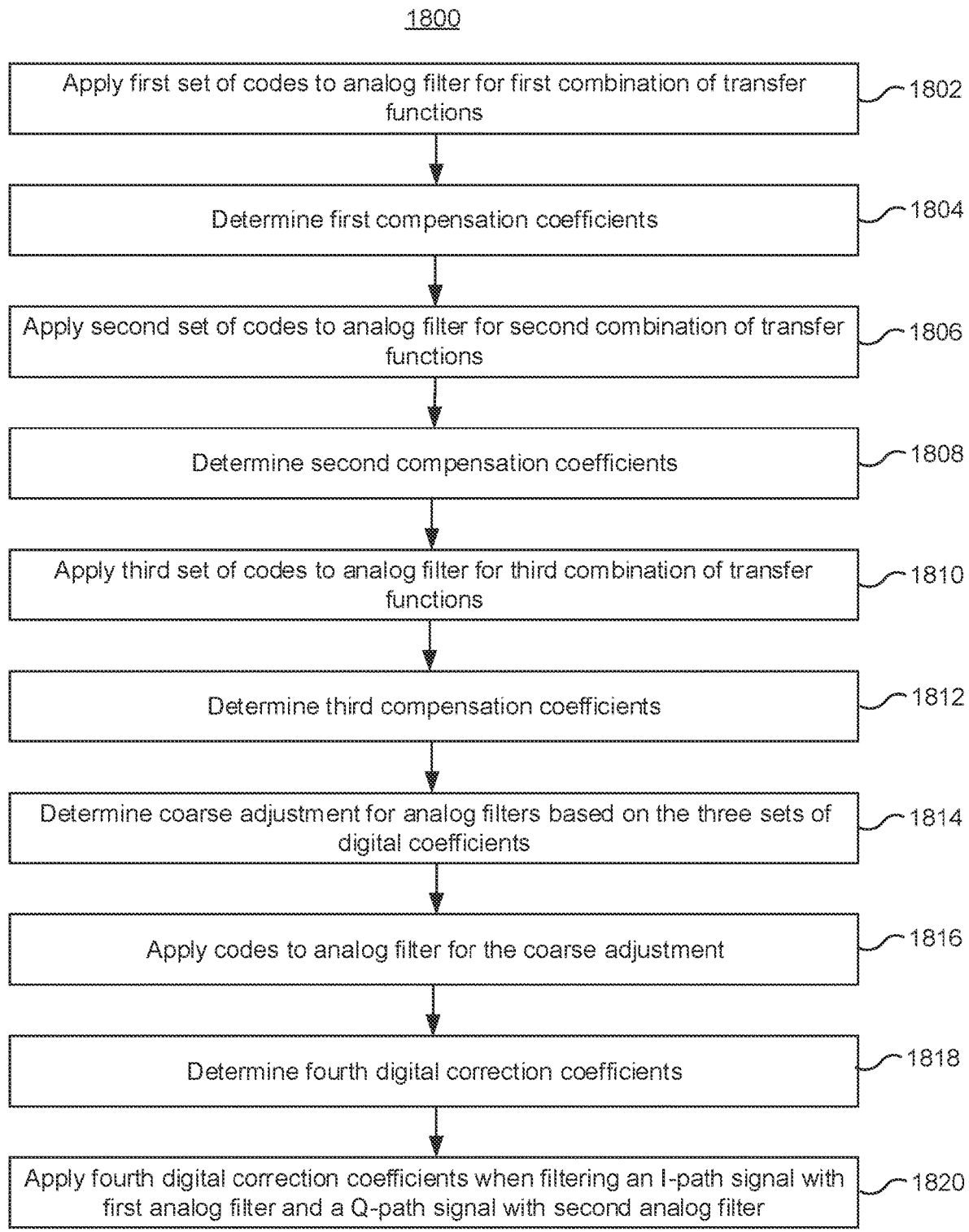
FIG. 18 is a flowchart of one embodiment of a process of compensating for I/Q imbalance.

Step 1614 includes applying compensation coefficients to the I/Q imbalance compensation circuit 430 when processing an I-path signal with first analog filter and a Q-path signal using second analog filter. Note that the I-path signal and the Q-path signal are not the calibration signal, in one embodiment. The I-path signal and the Q-path signal may be for an RF signal that is being transmitted from a transmitter or for an RF signal that is being received by a receiver, FIG. 18 is a flowchart of one embodiment of a process 1800 of compensating for I/Q imbalance. The process 1800 is used to compensate for I/Q imbalance in an RF transmitter, in one embodiment. The process 1800 is used to compensate for I/Q imbalance in an RF receiver, in one embodiment. The process 1800 may be performed in, but is not limited to, user equipment 110, base station 170, receivers 404, 1000, transmitters 502, 700, 800, or apparatus 600. Process 1800 describes further details of one embodiment of process 1200. Process 1800 describes further details of one embodiment of process 1600. Note that process 1800 is performed "off-line," in one embodiment. For example, process 1800 may be performed soon after the transceiver (or apparatus containing the transceiver) is manufactured. Process 1800 may also be performed "in the field."

Step 1802 includes applying a first set of codes to at least one of the counterpart analog filters for a first combination of transfer functions of the counterpart analog filters. Applying these codes creates a first mismatch between the filters, in one embodiment. Filter adjust and I/Q coefficient estimation 706 may apply the first set of codes. These codes may be pre-determined.

Step 1804 includes determining first compensation coefficients. These first compensation coefficients may be determined by the filter adjust and I/Q coefficient estimation 706 and may be suitable to apply to the /Q imbalance compensation circuit 430 in order to compensate for I/Q imbalance when the first set of codes are applied to the filters. Step 1804 includes determining a frequency independent compensation coefficient and frequency independent compensation coefficient, in one embodiment.

Step 1806 includes applying a second set of codes to at least one of the counterpart analog filters for a second combination of transfer functions of the counterpart analog filters. Applying these codes creates a second mismatch between the filters, in one embodiment. Filter adjust and I/Q coefficient estimation 706 may apply the second set of codes. These codes may be pre-determined.

Step 1808 includes determining second compensation coefficients. These second compensation coefficients may be determined by the filter adjust and I/Q coefficient estimation 706 and may be suitable to apply to the I/Q imbalance compensation circuit 430 in order to compensate for I/Q imbalance when the second set of codes are applied to the filters. Step 1808 includes determining a frequency independent compensation coefficient and frequency independent compensation coefficient, in one embodiment.

Step 1810 includes applying a third set of codes to at least one of the counterpart analog filters for a third combination of transfer functions of the counterpart analog filters. Applying these codes creates a third mismatch between the filters, in one embodiment. Filter adjust and I/Q coefficient estimation 706 may apply the third set of codes. These codes may be pre-determined.

Step 1812 includes determining third compensation coefficients. These third compensation coefficients may be determined by the filter adjust and I/Q coefficient estimation 706 and may be suitable to apply to the I/Q imbalance compensation circuit 430 in order to compensate for I/Q imbalance when the third set of codes are applied to the filters. Step 1812 includes determining a frequency independent compensation coefficient and frequency independent compensation coefficient, in one embodiment.

Step 1814 includes determining a coarse adjustment for counterpart analog filters based on the three sets of compensation coefficients. In one embodiment, the three sets of compensation coefficients comprise a frequency dependent coefficient in each set. Thus, three frequency dependent coefficients are determined. In one embodiment, curve fitting is used based on the three points. In one embodiment, a quadratic fit is used. More generally, a polynomial fit may be used. This may, in effect, produce a curve similar to curve 1702 (see FIG. 17). The coarse adjustment may be determined based on the minimum point on the curve. For example, with reference to curve 1702, the minimum point may correlate to the least filter mismatch.

Step 1816 includes applying codes to the counterpart analog filters to cause the coarse adjustment (of step 1804). Filter adjust and I/Q coefficient estimation 706 may apply codes to the filters.

Step 1818 includes determining fourth compensation coefficients. These fourth compensation coefficients may be determined by the filter adjust and I/Q coefficient estimation 706 and may be suitable to apply to the I/Q imbalance compensation circuit 430 in order to compensate for I/Q imbalance when the coarse adjustment is applied to the filters. Step 1818 includes determining a frequency independent compensation coefficient and frequency independent compensation coefficient, in one embodiment.

Step 1820 includes applying the fourth compensation coefficients to the I/Q imbalance compensation circuit 430 when filtering an I-path signal with first analog filter and a Q-path signal with second analog filter. If performed "off-line," the fourth compensation coefficients may be stored in, for example, a processor readable storage device. Therefore, the fourth compensation coefficients may later be used "in-the-field." Even when the process 1800 is performed in-the-field, the fourth compensation coefficients may be stored in processor readable storage for later use.

Some of the examples provided herein are for systems in which the quadrature generator 432 generates a first oscillator signal at 0 degrees and a second oscillator signal at 90 degrees relative to the first oscillator signal. Such as system may be used in what is referred to as a differential quadrature architecture (also referred to as a 4-Phase system). I/Q imbalance correction may also be used in which the transceiver uses a higher order number of phases. In one embodiment, the transceiver uses an 8-Phase system. In one embodiment of an 8-Phase transceiver, the quadrature generator 432 generates oscillator signals having frequencies of 0 degrees, 45 degrees, 90 degrees, and 135 degrees. Such as 8-Phase system may employ quadrature modulation in which the oscillator signal input to a Q-path frequency mixer is 90 degrees out of phase with respect to the oscillator signal input to an I-path frequency mixer. For example, the combination of 0 degrees and 90 degrees may be used, as well as the combination of 45 degrees and 135 degrees. Many other quadrature combinations are possible.

In one embodiment of an 8-Phase transmitter, there are four low pass filters. Each low pass filter is associated with one of the four phases (0 degrees, 45 degrees, 90 degrees, and 135 degrees). For the sake of discussion, these will be referred to as LPF_0, and LPF_45, LPF_90, and LPF_135. In one embodiment, LPF_0 and LPF_45 are in the I-path circuitry 450, and LPF_90 and LPF_135 are in the Q-path circuitry 460. In one embodiment, process 1200 is applied in a transceiver having an 8-Phase transmitter. In step 1202, a coarse adjustment is made to counterparts LPF_0 and LPF_90. Also, a coarse adjustment is made to counterparts LPF_45 and LPF_135. Thus, step 1202 of process 1200 may be applied to the two pairs of counterpart filters. Then, step 1204 may be performed to compensate for residual mismatch between the I-path circuitry and the Q-path circuitry.

Optionally, after performing process 1200 for the transceiver having an 8-Phase transmitter, an adjustment may be made to reduce mismatch between the following filter pairs: LPF_0/LPF_90, LPF_0/LPF_45, LPF_0/LPF_135. After this adjustment, step 1204 may be performed to reduce residual mismatch between the I-path circuitry and the Q-path circuitry.

Figure 19:
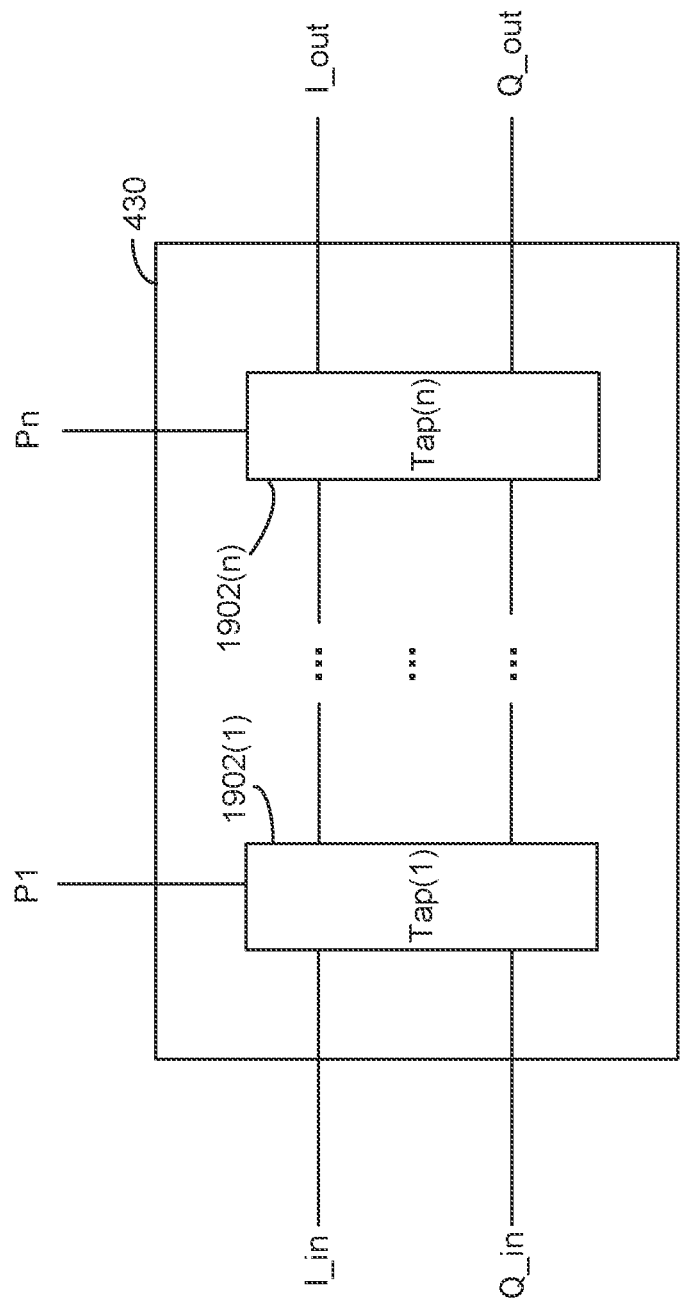
FIG. 19 depicts one embodiment of an I/Q imbalance compensation circuit.

FIG. 19 depicts one embodiment of an I/Q imbalance compensation circuit 430. The I/Q imbalance compensation circuit 430 may implement any known multi-tap I/Q imbalance compensation technique. FIG. 19 depicts just one possible implementation of an I/Q imbalance compensation circuit 430. Many other implementations are possible.

The I/Q imbalance compensation circuit 430 may be implemented in hardware, software, or a combination of hardware and software. The I/Q imbalance compensation circuit 430 processes a digital version of the I-path signal (I_in) and a digital version of the Q-path signal (Q_in) to compensate for I/Q imbalance. The I/Q imbalance compensation circuit 430 outputs a digital version of the I-path signal (I_out) a digital version of the Q-path signal (Q_out). Therefore, the I/Q imbalance compensation circuit 430 operates in the digital domain.

The I/Q imbalance compensation circuit 430 comprises multiple taps 1902(1) to 1902(n). Each tap receives a different compensation parameter, in one embodiment. For example, tap 1902(1) receives compensation parameter P1 and tap 1902(n) receives compensation parameter Pn. As depicted in FIG. 19, the digital input signals I_in and are first processed by tap 1902(1), and then processed by the next tap (if any) in succession, until reaching tap 1902)(n). Tap 1902(n) outputs the digital signals I_out and Q_out.

In one embodiment, tap 1902(1) receives a frequency independent coefficient, and tap 1902(2) receives a frequency dependent coefficient. In one embodiment, the I/Q imbalance compensation circuit 430 has three or more taps 1902. When there are three or more taps 1902, the additional taps are frequency dependent coefficients, in one embodiment.

The taps 1902 may implement any known technique for correcting I/Q imbalance. For example, a tap 1902 may provide amplitude correction, phase compensation, etc. A tap 1902 may include a filter configured to compensate for I/Q imbalance, in one embodiment.

The technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. A computer readable medium or media does (do) not include propagated, modulated or transitory signals.

Communication media typically embodies computer-readable instructions, data structures, program modules or other data in a propagated, modulated or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special-purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus for compensating for in-phase/quadrature (I/Q) phase path imbalance, comprising:
   in-phase-path (I-path) circuitry configured to process an I-path signal, the I-path circuitry comprising a first analog filter configured to filter the I-path signal;
   quadrature-path (Q-path) circuitry configured to process a Q-path signal, the Q-path circuitry comprising a second analog filter configured to filter the Q-path signal;
   an I/Q imbalance compensation circuit configured to process a digital version of the I-path signal and a digital version of the Q-path signal to compensate for mismatch between the I-path circuitry and the Q-path circuitry; and
   a first circuit configured to:
      determine a compensation parameter for the I/O imbalance compensation circuit to compensate for an initial mismatch between the I-path circuitry and the Q-path circuitry;
      determine a coarse adjustment based on the compensation parameter;
      apply the coarse adjustment to at least one of the first analog filter or the second analog filter to reduce the initial mismatch between the I-path circuitry and the Q-path circuitry; and
      operate the I/Q imbalance compensation circuit to compensate for a residual mismatch between the I-path circuitry and the Q-path circuitry with the coarse adjustment applied to the at least one of the first analog filter or the second analog filter.

2. The apparatus of claim 1, wherein the first circuit is further configured to:
   determine the coarse adjustment based on a correlation between the compensation parameter and mismatch between the first analog filter and the second analog filter.

3. The apparatus of claim 1, wherein the compensation parameter comprises a value for a frequency dependent coefficient.

4. The apparatus of claim 1, wherein the compensation parameter comprises a first value for a frequency independent coefficient and a second value for a frequency dependent coefficient.

5. The apparatus of claim 1, wherein the first circuit is further configured to:
   configure the first analog filter and the second analog filter to have a plurality of different mismatches;
   determine, for each of the different mismatches, a compensation parameter for the I/Q imbalance compensation circuit; and
   determine the coarse adjustment based on the compensation parameters for each of the different mismatches.

6. The apparatus of claim 2, wherein the first circuit is further configured to:
   determine the coarse adjustment based on an estimate that is predicted to minimize the mismatch between the first analog filter and the second analog filter.

7. The apparatus of claim 1, wherein:
   the I-path circuitry further comprises a first frequency mixer configured to up-convert the I-path signal to an I-path radio frequency (RF) signal after the first analog filter filters the I-path signal;
   the Q-path circuitry further comprises a second frequency mixer configured to up-convert the Q-path signal to a Q-path RF signal after the second analog filter filters the Q-path signal; and
   the apparatus further comprises signal combining circuitry configured to combine the I-path RF signal with the Q-path RF signal to form an RF transmission signal.

8. The apparatus of claim 7, wherein:
   the I-path signal comprises an I-path calibration signal;
   the first frequency mixer is configured to up-convert the I-path calibration signal to an I-path RF calibration signal;
   the Q-path signal comprises a Q-path calibration signal;
   the second frequency mixer is configured to up-convert the Q-path calibration signal to a Q-path RF calibration signal;
   the signal combining circuitry is configured to combine the I-path RF calibration signal with the Q-path RF calibration signal to form an RF transmission calibration signal; and
   the first circuit is further configured to sample the RF transmission calibration signal to determine the initial mismatch between the I-path circuitry and the Q-path circuitry.

9. The apparatus of claim 7, wherein the first circuit is further configured to:
   sample the I-path signal after it is filtered by the first analog filter but prior to being up-converted by the first frequency mixer;
   sample the Q-path signal after it is filtered by the second analog filter but prior to being up-converted by the second frequency mixer; and
   determine the initial mismatch between the I-path circuitry and the Q-path circuitry based on the sampled I-path signal and the sampled Q-path signal.

10. The apparatus of claim 1, wherein:
    the I/Q imbalance compensation circuit is configured to process the digital version of the I-path signal and the digital version of the Q-path signal to compensate for the residual mismatch between the I-path circuitry and the Q-path circuitry prior to the I-path signal being filtered by the first analog filter and prior to the Q-path signal being filtered by the second analog filter.

11. The apparatus of claim 1, wherein:
    the I-path circuitry further comprises a third frequency mixer configured to receive and down-convert a radio frequency (RF) signal to generate the I-path signal;
    the Q-path circuitry further comprises a fourth frequency mixer configured to receive and down-convert the RF signal to generate the Q-path signal;
    the first analog filter is configured to receive the I-path signal from the third frequency mixer; and
    the second analog filter is configured to receive the Q-path signal from the fourth frequency mixer.

12. The apparatus of claim 11, wherein:
    the I/Q imbalance compensation circuit is further configured to process the digital version of the I-path signal and the digital version of the Q-path signal to compensate for the residual mismatch between the I-path circuitry and the Q-path circuitry after the I-path signal has been filtered by the first analog filter and after the Q-path signal has been filtered by the second analog filter.

13. The apparatus of claim 1, wherein:
    the I-path circuitry further comprises a fifth frequency mixer; and
    the Q-path circuitry further comprises a sixth frequency mixer; and
    the apparatus further comprises an oscillator configured to provide an in-phase local oscillator signal to the fifth frequency mixer and a quadrature-phase local oscillator signal to the sixth frequency mixer.

14. A method for compensating for in-phase/quadrature (I/Q) phase path imbalance, the method comprising:
processing an I-path signal with I-path circuitry by filtering the I-path signal with a first analog filter;
processing a Q-path signal with Q-path circuitry by filtering the Q-path signal with a second analog filter;
determining a compensation parameter for an I/Q imbalance compensation circuit to compensate for an initial mismatch between the I-path circuitry and the Q-path circuitry;
determining a coarse adjustment based on the compensation parameter;
applying the coarse adjustment to at least one of the first analog filter or the second analog filter to reduce the initial mismatch between the I-path circuitry and the Q-path circuitry; and
processing a digital version of the I-path signal and a digital version of the Q-path signal to compensate for a residual mismatch between the I-path circuitry and the Q-path circuit with the coarse adjustment applied to the at least one of the first analog filter or the second analog filter.

15. The method of claim 14, wherein determining the compensation parameter comprises:
determining a first value for a frequency independent coefficient; and
determining a second value for a frequency dependent coefficient.

16. The method of claim 14, further comprising:
configuring the first analog filter and the second analog filter to have different mismatches;
determining, for each of the different mismatches, a compensation parameter for processing the digital version of the I-path signal and the digital version of the Q-path signal to compensate for the residual mismatch between the I-path circuitry and the Q-path circuitry; and
determining the coarse adjustment based on the compensation parameters for the different mismatches.

17. The method of claim 14, further comprising:
sampling a first output from the first analog filter and a second output from the second analog filter to determine the initial mismatch between the I-path circuitry and the Q-path circuitry.

18. The method of claim 14, further comprising:
providing the I-path signal from the first analog filter to a first frequency mixer;
up-converting the I-path signal with the first frequency mixer to form an I-path radio frequency (RF) signal;
providing the Q-path signal from the second analog filter to a second frequency mixer; and
up-converting the Q-path signal with the second frequency mixer to form a Q-path RF signal.

19. The method of claim 14, further comprising:
processing the digital version of the I-path signal and the digital version of the Q-path signal to compensate for the residual mismatch between the I-path circuitry and the Q-path circuitry prior to filtering the I-path signal with the first analog filter and prior to filtering the Q-path signal with the second analog filter.

20. The method of claim 14, further comprising:
down-converting a radio frequency (RF) signal with a third frequency mixer to form the I-path signal;
down-converting the RF signal with a fourth frequency mixer to form the Q-path signal;
filtering the I-path signal with the first analog filter after the I-path signal is down-converted by the third frequency mixer; and
filtering the Q-path signal with the second analog filter after the Q-path signal is down-converted by the fourth frequency mixer.

21. The method of claim 20, further comprising:
processing the digital version of the I-path signal and the digital version of the Q-path signal to compensate for the residual mismatch between the I-path circuitry and the Q-path circuitry after filtering the I-path signal with the first analog filter and after filtering the Q-path signal with the second analog filter.

22. A device for processing radio frequency signals, comprising:
I-path circuitry configured to process an I-path signal, the I-path circuitry comprising a first analog filter configured to filter the I-path signal and a first frequency mixer configured to frequency-convert the I-path signal;
Q-path circuitry configured to process a Q-path signal, the Q-path circuitry comprising a second analog filter configured to filter the Q-path signal and a second frequency mixer configured to frequency-convert the Q-path signal;
an oscillator configured to provide an in-phase local oscillator signal to the first frequency mixer and a quadrature-phase local oscillator signal to the second frequency mixer;
non-transitory memory storage; and
one or more processors in communication with the non-transitory memory storage, wherein the non-transitory memory storage store instructions for execution by the one or more processors to:
determine a compensation parameter to compensate for an initial mismatch between the I-path circuitry and the Q-path circuitry;
determine a coarse adjustment based on the compensation parameter;
apply the coarse adjustment to at least one of the first analog filter or the second analog filter to reduce the initial mismatch between the I-path circuitry and the Q-path circuitry; and
process a digital version of the I-path signal and a digital version of the Q-path signal to compensate for a residual mismatch between the I-path circuitry and the Q-path circuitry with the coarse adjustment applied to the at least one of the first analog filter or the second analog filter.

23. The device of claim 22, wherein the non-transitory memory storage stores the instructions for execution by the one or more processors to:
determine the coarse adjustment based on a correlation between the compensation parameter and mismatch between the first analog filter and the second analog filter.

* * * * *

UNITED STATES PATENT AND TRADEMARK OFFICE
CERTIFICATE OF CORRECTION

PATENT NO. : 11,539,570 B2
APPLICATION NO. : 17/341077
DATED : December 27, 2022
INVENTOR(S) : Hong Jiang et al.

It is certified that error appears in the above-identified patent and that said Letters Patent is hereby corrected as shown below:

In the Claims

In Column 33, Line 17, In Claim 1, delete "I/O" and insert -- I/Q --.

In Column 35, Line 22, In Claim 14, delete "circuit" and insert -- circuitry --.

Signed and Sealed this
Thirtieth Day of April, 2024

Katherine Kelly Vidal
*Director of the United States Patent and Trademark Office*